United States Patent [19]
Hagersten et al.

[11] Patent Number: 5,829,034
[45] Date of Patent: Oct. 27, 1998

[54] METHOD AND APPARATUS FOR A COHERENCE TRANSFORMER WITH LIMITED MEMORY FOR CONNECTING COMPUTER SYSTEM COHERENCE DOMAINS

[75] Inventors: Erik E. Hagersten, Palo Alto, Calif.; Mark Donald Hill; David A. Wood, both of Madison, Wis.

[73] Assignee: Sun Microsystems, Inc., Palo Alto, Calif.

[21] Appl. No.: 677,014

[22] Filed: Jul. 1, 1996

[51] Int. Cl.⁶ .................................................. G06F 13/00
[52] U.S. Cl. ..................... 711/141; 711/161; 711/146; 711/124; 711/145; 711/210
[58] Field of Search .................................... 395/468, 441, 395/442, 420, 200.02, 200.08, 200.15, 200.2, 471, 448, 473, 463, 472, 458

[56] References Cited

U.S. PATENT DOCUMENTS

| | | | |
|---|---|---|---|
| 4,539,655 | 9/1985 | Trussell et al. | 395/280 |
| 4,891,751 | 1/1990 | Call et al. | 395/800 |
| 5,072,369 | 12/1991 | Theus et al. | 395/473 |
| 5,182,801 | 1/1993 | Asfour | 395/200.08 |
| 5,283,886 | 2/1994 | Nishii et al. | 395/471 |
| 5,303,362 | 4/1994 | Butts, Jr. et al. | 395/448 |
| 5,522,045 | 5/1996 | Sandberg | 395/200.08 |
| 5,522,058 | 5/1996 | Iwasa et al. | 395/472 |
| 5,557,769 | 9/1996 | Bailey et al. | 395/473 |
| 5,579,504 | 11/1996 | Callander et al. | 395/471 |
| 5,588,131 | 12/1996 | Borrill | 395/473 |
| 5,590,308 | 12/1996 | Shih | 395/463 |
| 5,592,625 | 1/1997 | Sandberg | 395/200.08 |
| 5,634,110 | 5/1997 | Laudon et al. | 395/472 |
| 5,644,753 | 7/1997 | Ebrahim et al. | 395/458 |
| 5,655,100 | 8/1997 | Ebrahim et al. | 395/471 |

FOREIGN PATENT DOCUMENTS

0392657  10/1990  European Pat. Off. .

OTHER PUBLICATIONS

Lovett, et al., "Sting: A CC–NUMA Computer Iystem for the Commercial Marketplace", Sequent Computer Sytems, Inc., 15450 SW Koll Parkway, Beaverton, Oregon 97006, XP 000592195, ISCA '96 5/96 PA, USA.

Iwasa, et al., "SSM–MP: More Scalability in Shared–Memory Multi–Processor", Information and çommunicaiton Systems Laboratory, TOSHIBA çorporation, 2–9 Suehiro––cho Ome–shi Tokyo 198 Japan, 1995 IEEE.

Lenoski, et al., "The Stanford Dash Multiprocessor", 25 (1992) Mar., No. 3, Los Alamitos, CA US.

Krafka, et al., "An Empirical Evaluation of Two Memory–Efficient Directory Methods", Department of Electrical Engineering and Computer Sciences, University of California, Berkeley, 1990 IEEE.

*Primary Examiner*—Tod R. Swann
*Assistant Examiner*—Fred Fei Tzeng
*Attorney, Agent, or Firm*—Beyer & Weaver, LLP

[57] ABSTRACT

A coherence transformer for allowing a computer node and one or more external devices to share memory blocks having local physical addresses at a memory module of the computer node. The coherence transformer includes logic for ascertaining whether a memory access request from the external device for a memory block should be responded to using a snoop-only approach or an Mtag-only approach. The snoop-only approach requires a tag in a snoop tag array of the coherence transformer be available to track the memory block for an entire duration that the memory block is cached by the external device. The Mtag-only approach only temporarily stores the memory block until a global state associated with the memory block can be written back into the memory module of the computer node. The snoop tag array allows the coherence transformer to snoop the bus of the computer node to intervene and respond to memory access requests pertaining to a memory block externally cached and tracked by the snoop tag array.

20 Claims, 14 Drawing Sheets

| STATE | REPRESENTING | MEANING |
|---|---|---|
| gM | Global Modified | Internal domain has a valid, exclusive (and potentially modified) copy; there are no valid external copies |
| gS | Global Shared | Internal domain has valid, shared copy or copies; there may be shared copy or copies externally |
| gI | Global Invalid | Internal domain does not have a valid (exclusive or shared) copy; there is a valid exclusive (and potentially modified) external copy |

Fig. 4

| State | Representing | Meaning |
| --- | --- | --- |
| eI | Invalid | CT does not have copy |
| eS | Shared | CT owns a shared copy |
| eM | Exclusive | CT owns an exclusive (potentially modified) copy |

Fig. 7B

| Bus to CT | Current State | CT to X | X to CT | CT to Bus | Bus to Ct | New State | Comment |
|---|---|---|---|---|---|---|---|
| RTO | eI | | | | | | Ignore |
| | eS | XINV | XINV_ack | RTO | | eI | |
| | eM | XRTO | XRTO_data | RTO_data<br>RTO_data | RTO_data | eI | |
| RTS | eI | | | | | | Ignore |
| | eS | | | RTS | RTS_data | eS | |
| | eM | XRTS | XRTS_data | RTS_data<br>RTS_data | | | |
| WB | eI | | | | | | Ignore |
| | eS or eM | | | | | | Error |

FIG. 10

| X to CT | Current State | Allocate Tag? | CT to Bus | Bus to CT | CT to X | X to CT | New State | Comments |
|---|---|---|---|---|---|---|---|---|
| XRTO | eI | Yes, | RTO | RTO_data | | | eM | |
| | eS | No | RTO | RTO_data | XRTO_data | | eM | |
| | eM | | | | XRTO_data | | | Error |
| XRTS | eI | Yes, | RTS | RTS_data | XRTS_data | | eS | |
| | eS | No | RTS | RTS_data | XRTS_data | | eS | |
| | eM | | | | | | | Error |
| XWB | eI or eS | No | WB | | | XWB_data | | Error |
| | eM | | WB_data | | | | eI | |

Fig. 11

| REQUEST | ACTION | POSSIBLE RESPONSES |
|---|---|---|
| RTO | Get exclusive copy of memory block and invalidate all other copies | RTO_data, RTO_nack |
| RRTO | Get exclusive copy of memory block from external side and invalidate all other copies | RTOR_data, RTOR_nack |
| RTS | Get shared, read-only copy of memory block | RTS_data, RTS_nack |
| RRTS | Get shared, read-only copy of memory block from external side | RTSR_data, RTSR_nack |
| WB | Request to write back currently cached exclusive copy of memory block | WB_ack, WB_nack |

Fig. 12

| RESPONSES | ACTION | DATA? |
|---|---|---|
| RTO_data | Reply with exclusive copy of memory block | Y |
| RTO_nack | Not acknowledged, retry RTO progenitor | N |
| RTOR | write a gM state to memory for the requested memory block | Y |
| RTOR_data | Reply with exclusive copy of memory block | Y |
| RTOR_nack | Not acknowledged, retry RRTO progenitor | N |
| RTS_data | Reply with shared copy of memory block | Y |
| RTS_nack | Not acknowledged, retry RTS progenitor | N |
| RTSR | write a gS state to memory for the requested memory block | Y |
| RTSR_data | Reply with shared copy of memory block | Y |
| RTSR_nack | Not acknowledged, retry RRTS progenitor | N |
| WB_nack | Not acknowledged, retry WB progenitor | Y |
| WB_data | Reply with data to be written back | Y |

Fig. 13

| Bus to CT | MTag | CT to X | X to CT | CT to Bus | Bus to CT | New MTag | Comments |
|---|---|---|---|---|---|---|---|
| RRTO | gM | | | | | | Error: Ask RRTO progenitor to retry. |
| | gS | XINV | XINV_ack | RTO | RTO_data | gM | |
| | gI | XRTO | XRTO_data | RTOR | RTOR_data | gM | |
| RRTS | gM, gS | | | RTOR | RTOR_data | | Error: Ask RRTO progenitor to retry. |
| | gI | XRTS | XRTS_data | RTSR | RTSR_data | gS | |

Fig. 14

| X to CT | MTag | CT to Bus | Bus to CT | CT to X | X to CT | New MTag | Comments |
|---|---|---|---|---|---|---|---|
| XRTO | gM gS | RTO WB WB_data | RTO_data | | | | |
| | gI | | | XRTO_data | | gI | Error |
| XRTS | gM, gS | RTSM | RTSM_data | | | | |
| | gI | | | XRTS_data | | gS | Error |
| XWB | gM, gS | | | | | | Error |
| | gI | WSgM WSgM_data | | | XWB_data | gM | |

Fig. 15

METHOD AND APPARATUS FOR A COHERENCE TRANSFORMER WITH LIMITED MEMORY FOR CONNECTING COMPUTER SYSTEM COHERENCE DOMAINS

CROSS REFERENCE TO RELATED PATENT APPLICATIONS

This patent application is related to the following copending, commonly assigned patent applications, the disclosures of which are incorporated herein by reference in their entirety:

1. "Extending The Coherence Domain Beyond A Computer System Bus" by Hagersten et al., filed concurrently herewith. (Reference Number P990)

2. "Method And Apparatus Optimizing Global Data Replies In A Computer System" by Hagersten, filed concurrently herewith. (Reference Number P991)

3. "Method And Apparatus Providing Short Latency Round-Robin Arbitration For Access To A Shared Resource" by Hagersten et al., filed concurrently herewith. (Reference Number P992)

4. "Implementing Snooping On A Split-Transaction Computer System Bus" by Singhal et al., filed concurrently herewith. (Reference Number P993)

5. "Split Transaction Snooping Bus Protocol" by Singhal et al., filed concurrently herewith. (Reference Number P989)

6. "Interconnection Subsystem For A Multiprocessor Computer System With A Small Number Of Processors Using A Switching Arrangement Of Limited Degree" by Heller et al., filed concurrently herewith. (Reference Number P1609)

7. "System And Method For Performing Deadlock Free Message Transfer In Cyclic Multi-Hop Digital Computer Network" by Wade et al., filed concurrently herewith. (Reference Number P1572)

8. "Synchronization System And Method For Plesiochronous Signaling" by Cassiday et al., filed concurrently herewith. (Reference Number P1593)

9. "Methods And Apparatus For A Coherence Transformer For Connecting Computer System Coherence Domains" by Hagersten et al., filed concurrently herewith. (Reference Number P1519)

10. "Methods And Apparatus For A Coherence Transformer With Limited Memory For Connecting Computer System Coherence Domains" by Hagersten et al., filed concurrently herewith. (Reference Number P1530)

11. "Methods And Apparatus For Sharing Stored Data Objects In A Computer System" by Hagersten et al., filed concurrently herewith. (Reference Number P1463)

12. "Methods And Apparatus For A Directory-Less Memory Access Protocol In A Distributed Shared Memory Computer System" by Hagersten et al., filed concurrently herewith. (Reference Number P1531)

13. "Hybrid Memory Access Protocol In A Distributed Shared Memory Computer System" by Hagersten et al., filed concurrently herewith. (Reference Number P1550)

14. "Methods And Apparatus For Substantially Memory-Less Coherence Transformer For Connecting Computer System Coherence Domains" by Hagersten et al., filed concurrently herewith. (Reference Number P1529)

15. "A Multiprocessing System Including An Enhanced Blocking Mechanism For Read To Share Transactions In A NUMA Mode" by Hagersten, filed concurrently herewith. (Reference Number P1786)

16. "Encoding Method For Directory State In Cache Coherent Distributed Shared Memory Systems" by Guzovskiy et al., filed concurrently herewith. (Reference Number P1520)

17. "Software Use Of Address Translation Mechanism" by Nesheim et al., filed concurrently herewith. (Reference Number P1560)

18. "Directory-Based, Shared-Memory, Scaleable Multiprocessor Computer System Having Deadlock-free Transaction Flow Sans Flow Control Protocol" by Lowenstein et al., filed concurrently herewith. (Reference Number P1561)

19. "Maintaining A Sequential Stored Order (SSO) In A Non-SSO Machine" by Nesheim, filed concurrently herewith. (Reference Number P1562)

20. "Node To Node Interrupt Mechanism In A Multiprocessor System" by Wong-Chan, filed concurrently herewith. (Reference Number P1587)

21. "Deterministic Distributed Multicache Coherence Protocol" by Hagersten et al., filed Apr. 8, 1996, Ser. No. 08/630,703.

22. "A Hybrid NUMA Coma Caching System And Methods For Selecting Between The Caching Modes" by Hagersten et al., filed Dec. 22, 1995, Ser. No. 08/577,283.

23. "A Hybrid NUMA Coma Caching System And Methods For Selecting Between The Caching Modes" by Wood et al., filed Dec. 22, 1995, Ser. No. 08/575,787.

24. "Flushing Of Attraction Memory In A Computer System" by

24. "Flushing Of Attraction Memory In A Computer System" by Hagersten et al., filed concurrently herewith. (Reference Number P1416)

25. "Efficient Allocation Of Cache Memory Space In A Computer System" by Hagersten et al., filed concurrently herewith. (Reference Number P1576)

26. "Efficient Selection Of Memory Storage Modes In A Computer System" by Hagersten et al., filed concurrently herewith. (Reference Number P1726)

27. "Skip-level Write-through In A Multi-level Memory Of A Computer System" by Hagersten et al., filed concurrently herewith. (Reference Number P1736)

28. "A Multiprocessing System Configured to Perform Efficient Write Operations" by Hagersten, filed concurrently herewith. (Reference Number P1500)

29. "A Multiprocessing System Configured to Perform Efficient Block Copy Operations" by Hagersten, filed concurrently herewith. (Reference Number P1515)

30. "A Multiprocessing System Including An Apparatus For Optimizing Spin-Lock Operations" by Hagersten, filed concurrently herewith. (Reference Number P1525)

31. "A Multiprocessing System Configured to Detect and Efficiently Provide for Migratory Data Access Patterns" by Hagersten et al., filed concurrently herewith. (Reference Number P1555)

32. "A Multiprocessing System Configured to Store Coherency State within Multiple Subnodes of a Processing Node" by Hagersten, filed concurrently herewith. (Reference Number P1527)

33. "A Multiprocessing System Configured to Perform Prefetching, Operations" by Hagersten et al., filed concurrently herewith. (Reference Number P1571)

34. "A Multiprocessing System Configured to Perform Synchronization Operations" by Hagersten et al., filed concurrently herewith. (Reference Number P1551)

35. "A Multiprocessing System Having Coherency-Related Error Logging Capabilities" by Hagersten et al., filed concurrently herewith. (Reference Number P1719)

36. "Multiprocessing System Employing A Three-Hop Communication Protocol" by Hagersten, filed concurrently herewith. (Reference Number P1785)

37. "A Multiprocessing System Configured to Perform Software Initiated Prefetch Operations" by Hagersten, filed concurrently herewith. (Reference Number P1787)

38. "A Multiprocessing Computer System Employing Local and Global Address Spaces and Multiple Access Modes" by Hagersten, filed concurrently herewith. (Reference Number P1784)

39. "Multiprocessing System Employing A Coherency Protocol Including A Reply Count" by Hagersten et al., filed concurrently herewith. (Reference Number P1570)

BACKGROUND OF THE INVENTION

The present invention relates to a method and an apparatus for sharing memory among coherence domains of computer systems. More specifically, the invention relates to a novel method and apparatus for efficiently solving coherence problems when memory blocks having local physical addresses (LPA) in a particular computer node of a computer system are shared by other nodes of the system as well as by external entities coupled to that computer node.

The sharing of memory among multiple coherence domains presents unique coherence problems. To facilitate a discussion of these coherence problems, FIG. 1 shows a computer node 100 representing, e.g., a computer node in a more complex computer system. Within computer node 100, there are shown a plurality of processing nodes 102, 104, and 106 coupled to a common bus 108. Each of processing nodes 102, 104, and 106 represents, for example, a discrete processing unit that may include, e.g., a processor and its own memory cache. The number of processing nodes provided per computer node 100 may vary depending on needs, and may include any arbitrary number although only three are shown herein for simplicity of illustration.

Within computer node 100, a common bus 108 is shown coupled to a memory module 110, which represents the memory space of computer node 100 and may be implemented using a conventional type of memory such as dynamic random access memory (DRAM). Memory module 110 is typically organized into a plurality of uniquely addressable memory blocks 112. Each memory block of memory module 110, e.g., memory block 112(a) or memory block 112(b), has a local physical address (LPA) within computer node 100, i.e., its unique address maps into the memory space of computer 100. Each memory block 112 represents a storage unit for storing data, and each may be shared among processing nodes 102, 104, and 106 via common bus 108. Of course, there may be provided as many memory blocks as desired to satisfy the storage needs of computer node 100. In some cases, many memory modules 110 may be provided by computer node 100.

As is known to those skilled in the art, computer processors, e.g., processor 116 within processing node 102, typically operates at a faster speed than the speed of the memory module 110. To expedite access to the memory blocks 112 of memory module 110, there is usually provided with each processing node, e.g., processing node 102, a memory cache 114. A memory cache, e.g., memory cache 114, takes advantage of the fact that a processor, e.g., processor 116, is more likely to reference memory addresses that it recently references than other random memory locations. Further, memory cache 114 typically employs faster memory and tends to be small, which further contributes to speedy operation.

Within memory cache 114, there exists a plurality of block frames 118 for storing copies of memory blocks, e.g., memory blocks 112. Each block frame 118 has an address portion 120 for storing the address of the memory block it cached. If the unique address of memory block 112(a) is, e.g., FF5h, this address would be stored in address portion 120 of a block frame 118 when memory block 112(a) of memory module 110 is cached into memory cache 114. There is also provided in block frame 118 a data portion 122 for storing the data value of the cached memory block. For example, if the value stored in memory block 112(a) was 12 when memory block 112(a) was cached into block frame 118, this value 12 would be stored in data portion 122 of block frame 118.

Also provided in block frame 118 is a status tag 124 for storing the state of the memory block it cached. Examples of such states are, e.g., gM, gS, and gI, representing respectively global exclusive, global shared, and global invalid. The meanings of these states are discussed in greater detail herein, e.g., with reference to FIG. 4.

A processing node may hold an exclusive copy of a memory block in its cache when it is the only entity having a valid copy. Such exclusive copy may potentially be different from its counterpart in memory module 110, e.g., it may have been modified by the processing node that cached it. Alternatively, a processing node may possess a shared, read-only copy of a memory block. When one processing node, e.g., processing node 102, caches a shared copy of a memory block, e.g., memory block 112(a), other processing nodes, e.g., processing nodes 104 and 106, may also possess shared copies of the same memory block.

If a memory block is never cached in a processing node or it was once cached but is no longer cached therein, that processing node is said to have an invalid copy of the memory block. No valid data is contained in the block frame when the state associated with that block frame is invalid.

The coherence problem that may arise when memory block 112 is shared among the processing nodes of FIG. 1 will now be discussed in detail. Assuming that processing node 102 caches a copy of memory block 112(a) into its memory cache 114 to change the value stored in memory block 112 from 12 to 13. Typically, when the value is changed by a processing node such as processing node 102, that value is not updated back into memory module 110 immediately. Rather, the updating is typically performed when memory cache 114 of processing node 102 writes back the copy of memory block 112(a) it had earlier cached.

Now suppose that before memory cache 114 has a chance to write back the changed value of memory block 112(a), i.e., 13, into memory module 110, processing node 104 wishes to reference memory block 112(a). Processing node 104 would first ascertain in its own memory cache 132 to determine whether a copy of memory block 112(a) had been cached therein earlier. Assuming that a copy of memory block 112(a) has never been cached by processing node 104, a cache miss would occur.

Upon experiencing the cache miss, processing node 104 may then proceed to obtain a copy of memory block 112(a) from memory module 110. Since the changed value of memory block 112(a) has not been written back into memory module 110 by processing node 102, the old value stored in memory block 112(a), i.e., 12, would be acquired by processing node 104. This problem is referred to herein as the coherence problem and has the potential to provide erroneous values to processing nodes and other devices that share a common memory.

Up to now, the sharing of memory blocks 112 is illustrated only with reference to devices internal to computer node 100, i.e., devices such as processing nodes 102, 104, and 106 that are designed to be coupled to common bus 108 and communicate thereto employing the same communication protocol. There may be times when it is necessary to couple computer node 100 to other external devices, e.g., to facilitate the expansion of the computer system. Oftentimes, the external devices may employ a different protocol from that employed on common bus 108 of computer node 100 and may even operate at a different speed.

External device 140 of FIG. 1 represents such an external device. For discussion purposes, external device 140 may represent, for example, an I/O device such as a gateway to a network. Alternatively, external device 140 may be, for example, a processor such as a Pentium Pro™ microprocessor (available from Intel. Corp. of Santa Clara, Calif.), representing a processor whose protocol and operating speed may differ from those on common bus 108. As a further example, external device 140 may represent a distributed shared memory agent for coupling computer node 100 to other entities having their own memory spaces, e.g., other computer nodes having their own memory modules. Via the distributed shared memory agent, the memory blocks within computer node 100 as well as within those other memory-space-containing entities may be shared.

Although an external device may need to share the data stored in memory module 110, it is typically not possible to couple an external device, such as external device 140, directly to common bus 108 to allow external device 140 to share the memory blocks in memory module 110. The direct coupling is not possible due to, among others, the aforementioned differences in protocols and operating speeds.

In view of the foregoing, what is needed is an improved method and apparatus for permitting memory blocks having a local physical address (LPA) in a particular computer node to be shared, in an efficient and error-free manner, among interconnected entities such as other processing nodes and external devices.

SUMMARY OF THE INVENTION

The invention relates, in one embodiment, to a method, in a computer system having a computer node which has a common bus, for permitting an external device in an external domain that is external to the computer node to share memory blocks having local physical addresses in a memory module at the computer node. The invention facilitates such sharing irrespective whether the external device and the common bus both employ a common protocol and irrespective whether the external device and the common bus both operate at the same speed.

Each of the memory blocks has an associated Mtag (memory tag) for tracking a global state associated with the each of the memory block, including a global exclusive state for indicating that the each of the memory blocks is exclusive to the computer node, a global shared state for indicating that the each of the memory blocks is shared by the computer node with the external device, and a global invalid state for indicating that the each of the memory blocks is invalid in the computer node.

The method includes receiving, at a coherence transformer coupled to the common bus, a first memory access request for a first memory block from the external device. There is further included a step of obtaining a first copy of the first memory block, using the coherence transformer, from the common bus.

The coherence transformer has a snoop tag array having a plurality of snoop tags. Each of the plurality of snoop tags is configured to track an external state of a copy of one of the memory blocks if cached by the external device, the external state including one of an external exclusive state for indicating that the copy of one of the memory blocks is exclusive to the external domain, an external shared state for indicating that the copy of one of the memory blocks is shared by the external domain, and an external invalid state for indicating that the copy of one of the memory blocks is invalid in the external domain.

If at least one tag in the plurality of snoop tags is available for tracking the external state of the first copy of the first memory block, the method includes the step of responding to the first memory access request using a snoop-only approach, including tracking, using the at least one tag, the external state of the first copy of the first memory block.

On the other hand, if at least one tag in the plurality of snoop tags is not available for tracking the external state of the first copy of the first memory block, the method includes the step of responding to the first memory access request using an Mtag-only approach, including modifying, using the coherence transformer, a first Mtag associated with the first memory block in the memory module at the computer node to reflect that the external device is caching the first copy of the first memory block. There is also included the step of sending the first copy of the first memory block from the coherence transformer to the external device.

In another embodiment, the invention relates to an apparatus for facilitating the sharing of memory blocks between a computer node and an external device. The memory blocks has local physical addresses at the computer node.

Each of the memory blocks has an associated Mtag for tracking a global state associated with the each of the memory block, including a global exclusive state for indicating that the each of the memory blocks is exclusive to the computer node, a global shared state for indicating that the each of the memory blocks is shared by the computer node with the external device, and a global invalid state for indicating that the each of the memory blocks is invalid in the computer node.

The apparatus includes snooping logic configured for coupling with a common bus of the computer node. The snooping logic, when coupled to the common bus, monitors memory access requests on the common bus. There is also included a snoop tag array coupled to the snooping logic. The snoop tag array has a plurality of snoop tags, each of the plurality of snoop tags being configured to track an external state of a copy of one of the memory blocks if cached by the external device.

The external state includes one of an external exclusive state for indicating that the copy of one of the memory blocks is exclusive to the external domain, an external shared state for indicating that the copy of one of the memory blocks is shared by the external domain, and an external invalid state for indicating that the copy of one of the memory blocks is invalid in the external domain.

There is also included logic for ascertaining whether a first memory access request from the external device for a first memory block of the memory blocks should be responded to using a snoop-only approach or an Mtag-only approach. The snoop-only approach requires a tag in the snoop tag array to track the first memory block for an entire duration that the first memory block is cached by the external device. The Mtag-only approach only temporarily stores the first memory block until a global state associated with the first memory block can be written back into the memory module.

These and other advantages of the present invention will become apparent upon reading the following detailed descriptions and studying the various figures of the drawings.

BRIEF DESCRIPTION OF THE DRAWINGS

FIG. 4 shows, in one embodiment of the present invention, the various available states that may be stored in a Mtag.

FIG. 7B illustrates, in one embodiment, some of the external states tracked by the coherence transformer.

FIG. 8 illustrates, in accordance with one aspect of the present invention, the steps taken by the coherence transformer in response to a memory access request on the common bus.

FIG. 10 illustrates, in accordance with one aspect of the present invention, the steps taken by the coherence transformer in the snoop-only mode in response to a memory access request on the common bus.

FIG. 11 illustrates, in accordance with one aspect of the present invention, the steps taken by the coherence transformer in the snoop-only mode in response to a memory access request issued by one of the external devices.

FIGS. 12 and 13 illustrate, in accordance with one aspect of the present invention, the various requests and their possible responses in the Mtag-only mode.

FIG. 14 illustrates, in one embodiment of the present invention, selected transactions performed by the coherence transformer in the Mtag-only mode in response to remote memory access requests on the common bus.

FIG. 15 illustrates selected transactions performed by the coherence transformer in the Mtag-only mode in response to memory access requests from one of the external devices.

DETAILED DESCRIPTION OF THE PREFERRED EMBODIMENTS

An invention is described for permitting memory blocks having a local physical address (LPA) in a particular computer node to be shared, in an efficient and error-free manner, among interconnected entities such as internal processing nodes and external devices. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one aspect of the present invention, there is provided a coherence transformer for coupling a computer node, e.g., computer node 100, to a plurality of external devices. The coherence transformer permits an external device, which may employ a different protocol from that employed by computer node 100 and may even operate at a different speed, to access memory blocks having local physical addresses within computer node 100. In one aspect of the present invention, the coherence transformer monitors for selected memory access requests on the bus of computer node 100. If one of the selected memory access requests on the bus of computer node 100 pertains to a memory block currently cached by an external device, the coherence transformer may provide the latest copy of that memory block to the requesting entity, thereby avoiding a coherence problem. Further, the coherence transformer also permits the external devices to coherently obtain copies of memory blocks having local physical addresses within computer node 100.

Figure 2:
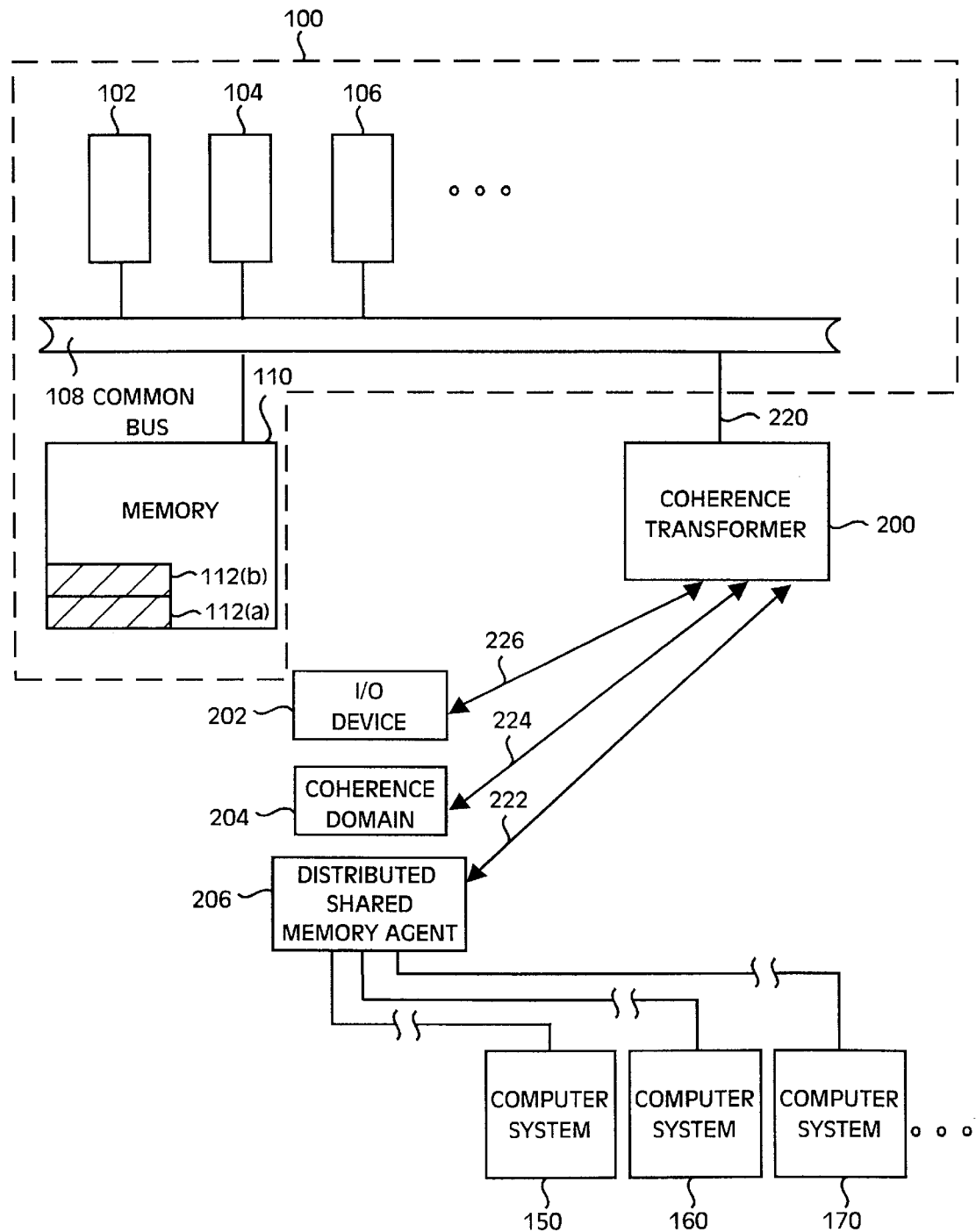
FIG. 2 shows, in accordance with one aspect of the present invention, a coherence transformer block.

The operational details of the coherence transformer may be better understood with reference to the drawings that follow. Referring now to FIG. 2, there is provided, in accordance with one aspect of the present invention, a coherence transformer 200 for coupling computer node 100 to one of a plurality of external devices 202, 204, and 206. Note that although only one of each type of external device (202, 204, or 206) is shown for ease of illustration, there may in fact exist many external devices of each type coupled to coherence transformer 200. Via coherence transformer 200, the contents of the memory blocks of memory module 110, e.g., memory blocks 112, may be accessed by any of external devices 202, 204, and 206. In accordance with one aspect of the present invention, memory blocks of memory module 110 may be shared by the external devices although these external devices employ protocols and operate at speeds different from those on common bus 108 of computer node 100.

External device 202 may represent, for example, an I/O device such as a gateway to a computer network that may obtain a few memory blocks 112 at a time from memory module 110 via coherence transformer 200. External device 204 may represent, for example, a coherence domain such as a processor, whose internal protocol and operating speed may differ from that running on common bus 108. Examples of differences include differences in block sizes and signaling. External device 206 may represent, for example, a distributed shared memory agent device.

Distributed shared memory agent device 206 may include logic circuitry for connecting computer node 100 to other distributed shared memory (DSM) domains such as other computer nodes to facilitate the sharing of memory blocks among different DSM domains and with computer node 100. Further, distributed shared memory agent device 206 may permit a processing node 102 in computer node 100 to access both memory block 112 within its local memory module 110 as well as well memory blocks associated with memory modules within computer nodes 150, 160, and 170, and vice versa. The use of distributed shared memory agent 206 creates the illusion that there is a centralized shared memory resource that the processors within computer nodes 100, 150, 160, and 170 may access although this centralized memory resource is physically implemented and distributed among different computer nodes.

Coherence transformer 200 may communicate with common bus 108 of computer node 100 via a coherence transformer link 220. On the external domain, coherence transformer 200 may communicate with any of the external devices e.g., any of external devices 202, 204, and 206, via links 222, 224, and 226 using a protocol that is appropriate for the external device with which it communicates.

Figure 3:
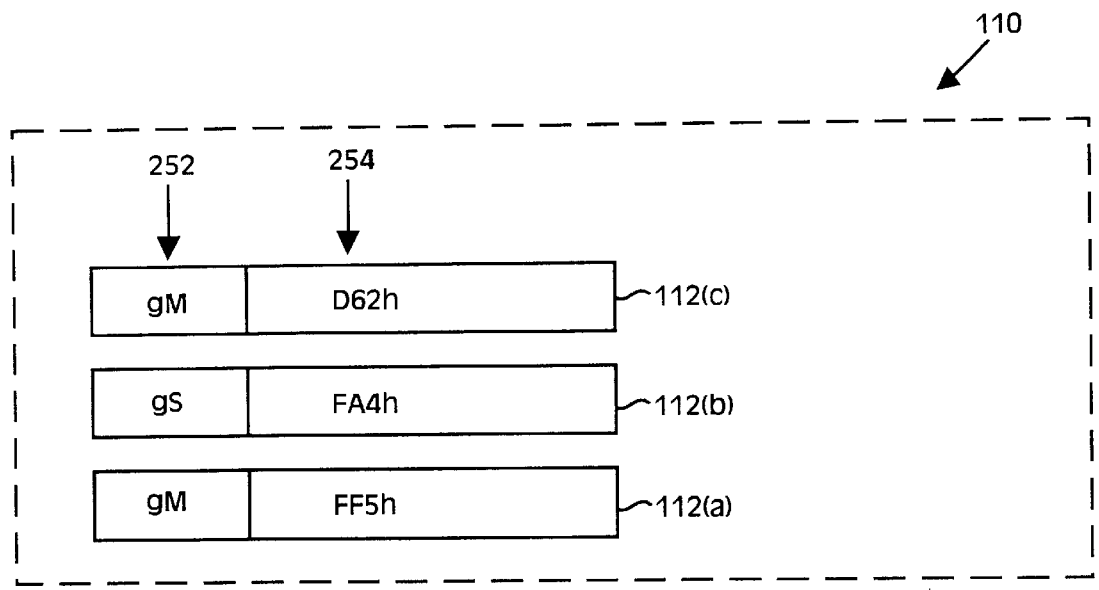
FIG. 3 shows, in accordance with one aspect of the present invention, the memory blocks and their associated memory tags (Mtags).

Referring now to FIG. 3, there are shown in memory module 110, in accordance with one aspect of the present invention, a plurality of memory tags (Mtags) 252. Each of Mtag 252 is logically associated with a memory block within memory module 110. In one embodiment, Mtags 252 are implemented in the same memory space, e.g., dynamic random access memory (DRAM), as the memory blocks with which they are associated and may be physically adjacent to its respective memory block 112. In another embodiment, Mtags 252 are logically associated with its respective memory blocks 112, albeit being implemented in a different memory space.

A Mtag 252 tracks the global state of its respective memory block, i.e., whether computer node 100 has exclusive, shared, or invalid access to a memory block (irrespective of which processing node has that memory block). FIG. 4 shows, in one embodiment of the present invention, the various available states that may be stored in a Mtag 252. In FIG. 4, three possible states are shown: gI, gS, or gM, signifying respectively that an invalid, shared, or exclusive copy of a memory block is being held by internal entities, i.e., entities within computer node 100. Note that for the purposes of the present invention, the state of a Mtag 252 is determined by whether its associated memory block is referenced by internal entities (e.g., by memory module 110 or any of processors 102, 104, and 106) or by devices in the external domain (i.e., external to computer node 100 such as any of external devices 202, 204, and 206). Further, the state of each Mtag is generally independent of which specific device within these domains currently has the memory block. Consequently, a Mtag can generally indicate whether an external device has a valid copy of a memory block. The state of Mtag generally cannot indicate which device, either internally or externally, currently has the latest valid copy.

If the state of Mtag 252 is gM, the internal domain has a valid, exclusive (and potentially modified from the copy in memory module 110) copy of the associated memory block. Further, there can be no valid (whether exclusive or shared) copy of the same memory block in the external domain since there can be no other valid copy of the same memory block existing anywhere when an exclusive copy is cached by a given device. If the state of Mtag 252 is gS, the internal domain has a valid, shared copy of the associated memory block. Further, since many shared copies of the same memory block can exist concurrently in a computer system, the external domain may have other shared copies of the same memory block as well. If the state of Mtag 252 is gI, the internal domain does not have a valid copy of the associated memory block. Since neither memory module 110 nor any bus entities 102, 104, and 106 has a valid copy, the valid copy may reside in the external domain. In one embodiment, when the state of Mtag 252 is gI, it is understood that the external domain has an exclusive (and potentially modified) copy of the associated memory block.

Figure 5:
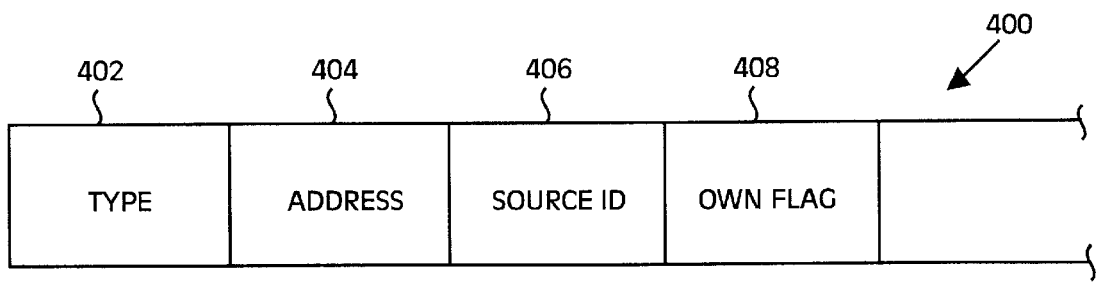
FIG. 5 shows in greater detail, in accordance with one aspect of the present invention, the format of a typical memory access request on common bus 108.

FIG. 5 shows in greater detail in accordance with one aspect of the present invention the format a memory access request 400, representing a typical memory access request on common bus 108. The memory access request may be output by, for example, one of the processing nodes 102, 104, or 106 or by coherence transformer 200 on behalf of one of the external devices 202, 204, or 206.

Memory access request 400 typically includes a type field 402, an address field 404, a source ID field (SID) 406, and an own flag 408. Type field 402 specifies the type of memory access request being issued. As will be discussed in detail in connection with FIG. 8 herein, memory access request types specified in field 402 may include, among others, a request to own (RTO), remote request to own (RRTO), request to share (RTS), remote request to share (RRTS), and write back (WB). Address field 404 specifies the address of the memory block being requested by the progenitor of memory access request 400. Source ID field 406 specifies the identity of the progenitor of memory access request 400, i.e., the entity that issues memory access request 400.

Own flag 408 represent the flag bit that is normally reset until one of the entities other than memory 110 that is capable of servicing the outstanding memory access request, e.g., one of processing nodes 100–106, sets own flag 408. An entity coupled to common bus 108 may wish to set own flag 408 to indicate that the current memory access request should not be serviced by memory module 110, i.e., one of the entities capable of caching that memory block had done so and may now potentially have a newer copy than the copy in memory module 110.

Figure 6:
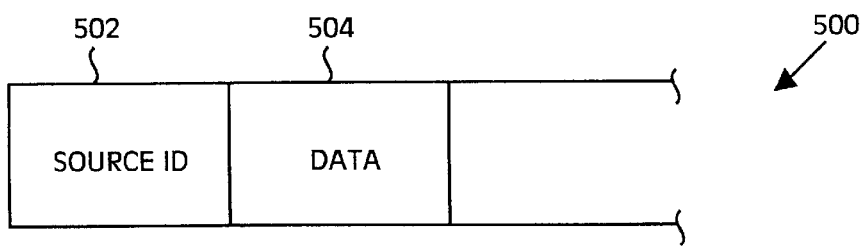
FIG. 6 shows in greater detail, in accordance with one aspect of the present invention, the format of a typical response to the request of FIG. 5.

FIG. 6 shows in greater detail in accordance with one aspect of the present invention the format of a response 500. Response 500 is typically issued by the entity responding to an earlier issued memory access request, e.g., one having the format of memory access request 400 of FIG. 5. As is shown in FIG. 6, response 500 includes a source ID (SID) field 502, representing the unique ID of the requesting entity to which the response should be sent. In one embodiment, the content of SID field 502 is substantially similar to the SID data contained in source ID field 406 of FIG. 4. The use of the source ID permits coherence transformer 200 to communicate directly with common bus 108 and entitles coherence transformer 200 to rely on the mechanism of common bus 108 to forward the response, using the SID, to the appropriate final destination. Response 500 further includes a data field 504, representing the content of the relevant memory block.

Figure 7A:
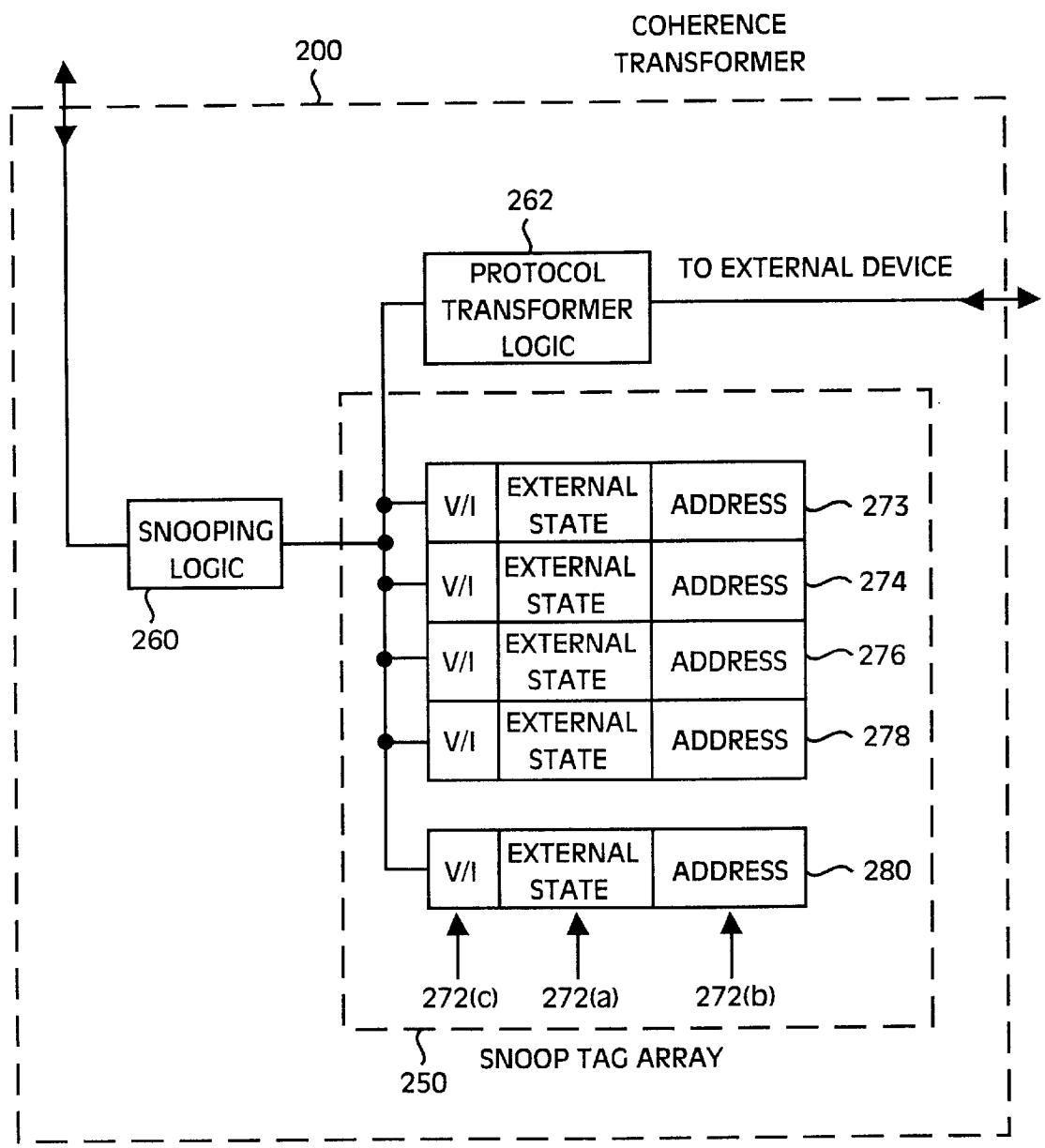
FIG. 7A shows, in one embodiment, the functional units within the coherence transformer.

FIG. 7A shows, in one embodiment, the functional units within coherence transformer 200. In one embodiment, the functional units are implemented as digital logic circuits. As can be appreciated by those skilled in the art, however, these functional units may be implemented either in hardware (digital or analog) or in software, depending on needs. Within coherence transformer 200, there is shown in coherence transformer 200 a tag array 250, representing the mechanism for keeping track of the memory blocks accessed by a device on the external side, e.g., one of external devices 202, 204, and 206. Within tag array 250, there is shown a plurality of tags 273, 274, 276, 278. In one embodiment, there may be provided as many tags in tag array 250 as reasonably possible. As will be discussed in greater detail later, the provision of a large number of tags in snoop tag array 250 advantageously minimizes any impact on the bandwidth of common bus 108 when a large number of memory blocks are cached by the external domain. Of course, the number of tags in tag array 250 may vary depending on needs and may represent any arbitrary number.

In accordance with one aspect of the invention, externally cached memory blocks are tracked, for the duration that they are externally cached, in tags within snoop tag array 250 whenever possible. When tags run out, i.e., when there are more memory blocks currently cached externally than there are available tags within snoop tag array 250, the invention advantageously permits the extra memory blocks to be externally cached without tracking them in snoop tag array 250 for the entire duration that they are externally cached.

As will be described in detail herein, buffer 280 represents a tag especially dedicated for temporarily storing memory blocks that are going to be cached externally without being tracked in snoop tag array 250 (referred herein as the Mtag-only approach). In other words, the purpose of buffer 280 is to temporarily track memory blocks cached externally in accordance with the Mtag-only approach and while in transit. Once that memory block is properly cached externally using the Mtag-only approach, e.g., by writing back to memory module 110 the proper Mtag state, buffer 280 may be recycled to temporarily track another memory block externally cached using the Mtag-only approach and while in transit. In one embodiment, multiple buffers 280 may be provided to track memory blocks in transit and cached externally using the Mtag-only approach.

Note that buffer 280 does not track an externally cached memory block for the entire duration that that memory block is cached externally. In other words, buffer 280 may be recycled for reuse in temporarily storing the identity of another externally tracked memory block that is in transit and externally cached using the Mtag-only approach even if the last memory block it temporarily stored is still being cached externally. This is different from the function provided by tags of snoop tag array 250, e.g., tags 273, 274, 276, and 278, which track externally cached memory blocks for the entire duration that they are cached externally, and are only recycled for reuse when the memory blocks they track are no longer externally cached. Because of its temporary storage purpose, buffer 280 may not be counted, in one embodiment, as part of the tags available for tracking externally cached blocks since buffer 280 may be used for temporary storage only. The operation of buffer 280 will be described in detail herein.

Figure 1:
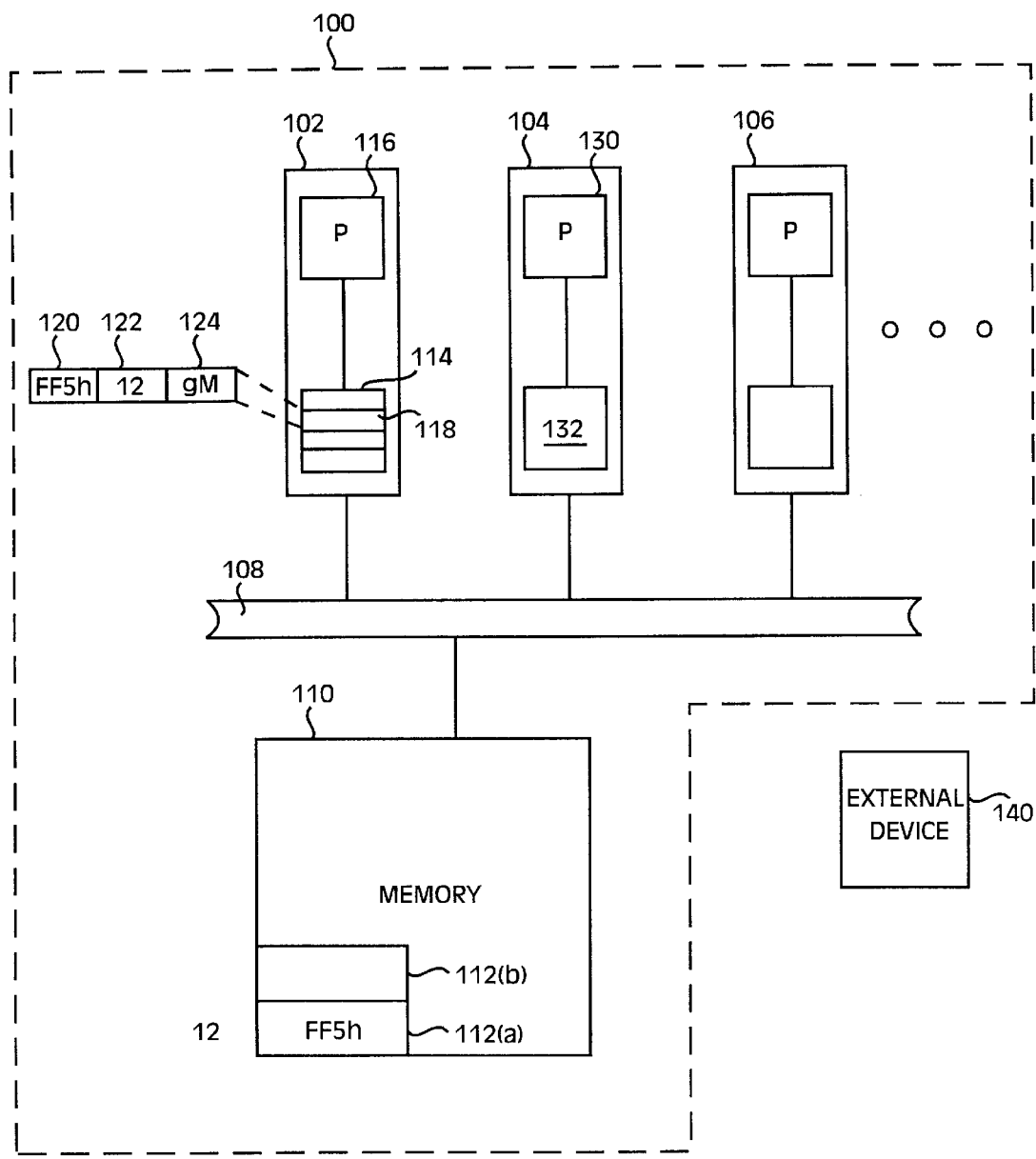
FIG. 1 shows, for discussion purposes, a computer node representing, e.g., a computer node in a more complex computer system.

There is coupled to tag array 250 a snooping logic 260, representing the circuitry employed to monitor memory access requests on common bus 108 on FIG. 1. In one embodiment, snooping logic 260 is substantially similar to the conventional snooping logic employed in each of processing nodes 102, 104, and 106 for permitting those processing nodes to monitor memory access requests on common bus 108.

Within each tag, e.g., tag 273, there is a state field 272(a), an address field 272(b), and an optional valid flag 272(c). Optional valid flag 272(c) indicates whether a tag is allocated or is empty. In one embodiment, state field 272(a) may store one of the three states (eM, eS, and eI) although additional states may be employed if desired. FIG. 7B shows, in one embodiment of the present invention, the various available states that may be stored in state field 272(a) of the tags of tag array 250. In FIG. 7B, three possible external states are shown: eI, eS, and eM, signifying respectively that an invalid, shared, and exclusive copy of a memory block is being cached by an external device. Note that these external states are different from the global states in that the external states reflect the states of the memory block from the perspective of the external domain. On the other hand, the global states (reflected in the Mtags) reflect the states of the memory blocks from the perspective of the internal domain. Address field 272(b) stores the address of the memory block cached, thereby permitting coherence transformer 200 to track the memory blocks that both are currently cached by an external device and tracked within snoop tag array 250.

It should be apparent to those skilled in the art from the foregoing that some type of protocol conversion may be necessary to permit devices and systems utilizing different protocols and/or operating at different speeds to share memory blocks. Protocol transformer logic 262 represents the circuitry that permits coherence transformer 200 to communicate with an external device, e.g., one of external devices 202, 204, and 206. Protocol transformer logic 262 may be omitted, for example, if the external device employs the same protocol as that employed in computer system 100 or operates at the same speed. Keep in mind that the specific protocol employed to communicate with a specific external device may vary greatly depending on the specification of the protocol employed by that external device. As will be discussed in greater detail herein, it is assumed that communication for the purpose of sharing memory blocks with the external devices can be accomplished using a generalized protocol known as the X-protocol. The adaptation of the described X-protocol to a specific external device should be readily apparent to those skilled in the art given this disclosure.

In one aspect of the present invention, the coherence transformer tracks as many of the memory blocks cached by the external device as it can in the tags of snoop tag array 250. As will be discussed in detail later herein, whenever coherence transformer 200 can track an externally cached memory block in a tag within snoop tag array 250 for the entire duration of that the block is externally cached, i.e., there is room in snoop tag array 250 for such tracking, there is no need to change the Mtag state of that memory block within memory module 110. Advantageously, when the system operates in the snoop-only approach, adverse impact on common bus 108 is minimized since there is no need to take up the bandwidth of common bus 108 to perform a write to memory module 110 to change the Mtag of externally cached memory blocks.

On the other hand, when there is no more room in snoop tag array 250 for such tracking, the invention still allows a memory block within memory module 110 to be externally cached. Instead of tracking this externally cached memory block in snoop tag array 250 for the entire duration of that the block is externally cached, however, coherence transformer 200 merely temporarily track this memory block in a buffer that is especially reserved for this purpose, e.g., buffer 280, and writes the new Mtag back into memory 110 at the earliest opportunity. Once the new Mtag is written into memory 110, there is advantageously no need to continue to track this memory block, and buffer 280 can be made available again (via a flag, for example) to temporarily track another externally cached memory block.

The coherence transformer then monitors memory access requests on the bus of computer system 100. If one of the memory access requests on the bus of computer system 100 pertains to a memory block currently cached by an external device and tracked in snoop tag array 250(whether in tags 273–278 or temporarily in buffer 280), the coherence transformer enters the snoop-only mode. As the term is used herein, the snoop-only mode pertains to the mode wherein coherence transformer 200, having found a match between the requested memory block and one of the memory blocks tracked in snoop tag array 250, intervenes to provide the latest copy of that memory block, instead of allowing memory module 110 to respond to the outstanding memory access request. In this manner, coherence problems are advantageously avoided.

If the outstanding memory access does not pertain to a memory block currently tracked in a tag of snoop tag array 250 (whether in tags 273–278 or temporarily in buffer 280), the requested memory block is either not cached by an external device, or is currently cached by an external device but the Mtag state in memory module 110 has been modified, coherence transformer 200 does nothing for the moment. This is because there would be no harm in allowing in allowing memory module 110 to respond and to subsequently handle this memory access request using the Mtag only approach.

Figure 8:
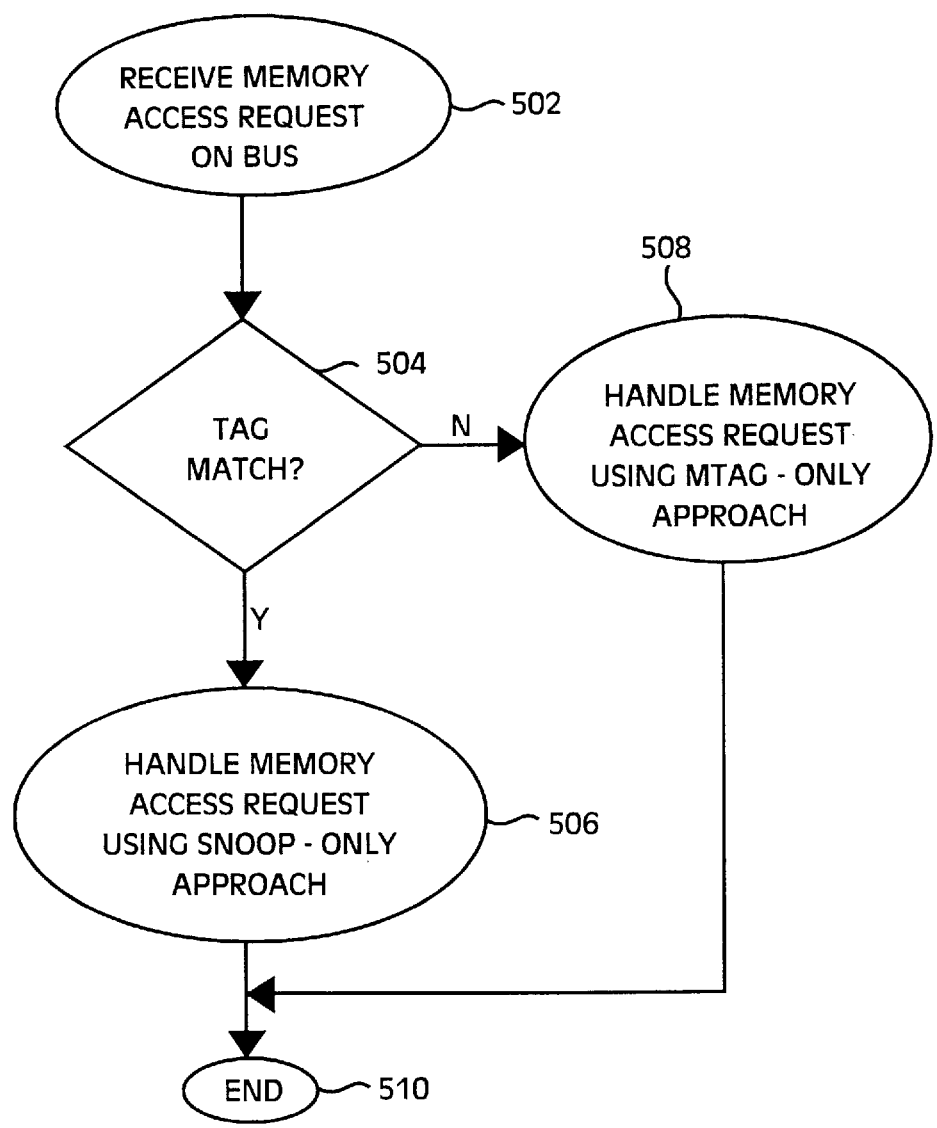
FIG. 8 illustrates, in accordance with one aspect of the present invention, the steps taken by the coherence transformer

FIG. 8 illustrates, in accordance with one aspect of the present invention, the steps involved for coherence transformer 200 to respond to a memory access request outstanding on common bus 108, i.e., one originated in the internal domain. In step 502, a memory access request appears on common bus 108 and seen by coherence transformer 200, which is coupled thereto. In step 504, coherence transformer ascertains whether the requested memory block, i.e., the one requested in the internally originated memory access request on common bus 108, matches one of the memory blocks tracked by the tags in snoop tag array 250.

If there is a match, the method proceeds to step 506 wherein outstanding memory access request on common bus 108 is handled in accordance with the snoop-only approach (described in detail in section A herein). On the other hand, when there is not a match, the method proceeds to step 508 wherein outstanding memory access request on common bus 108 is handled in accordance with the Mtag-only approach (described in detail in section B herein).

Figure 9:
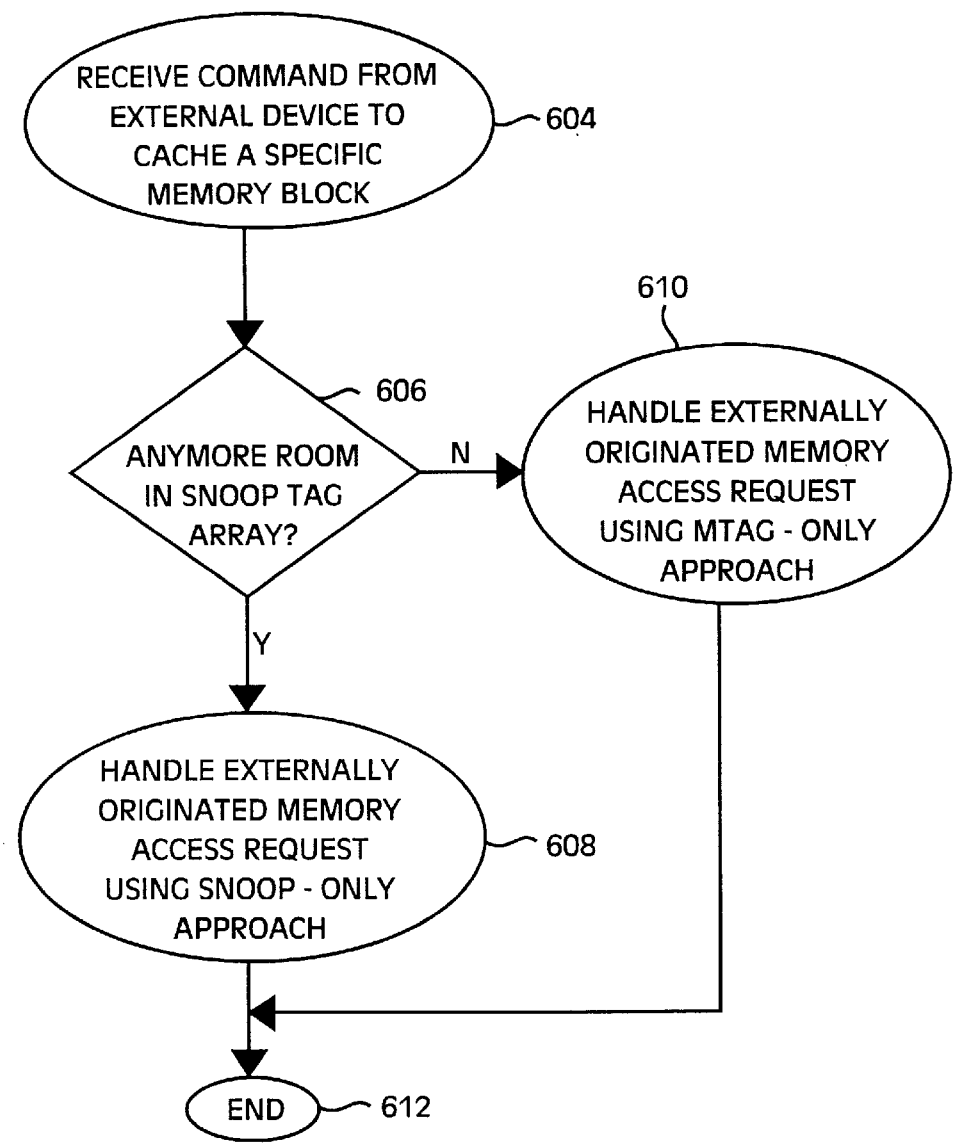
FIG. 9 illustrates, in accordance with one aspect of the present invention, the steps taken by the coherence transformer in response to a memory access request issued by one of the external devices.

FIG. 9 illustrates, in accordance with one aspect of the present invention, the steps involved for coherence transformer 200 to handle a memory access request originated in the external domain, i.e., issued by one of the external devices. In step 604, coherence transformer 200 receives from the external device a command to cache a specific memory block within memory module 110. In step 606, coherence transformer ascertains whether there is room in its snoop tag array 250 to track this memory block for the entire duration of its being externally cached. In one embodiment, the check in step 606 involves determining whether there is one unused tag, beside the buffer(s) set aside for temporary storage of memory blocks in transition when all other tags are full, to track the externally requested memory block.

If there is room in snoop tag array 250 to track this memory block for the entire duration of its being externally cached, the method proceeds to step 608 wherein the external memory access request is handled in accordance to the snoop-only approach (described in detail in section A herein).

On the other hand, if there is no room to track this externally requested memory block for the entire duration of its being externally cached, the method proceeds to step 610 wherein the external memory access request is handled in accordance to the Mtag-only approach (described in detail in section B herein).

To increase the likelihood that a new externally originated request can advantageously employ the snoop-only approach (thereby saving the bandwidth of common bus 108), the coherence transformer may opt to select to replace a snoop tag (e.g., 273 in FIG. 7A). In other words, the coherence transformer may opt to unallocate a snoop tag although the memory block it tracks is still cached by an external device. To do this, the coherence transformer writes the block's Mtag into memory module 110 as a function of the current external state. For example, if the external state is eM, the Mtag should be set to gI, eS sets Mtag to gS, and eI sets Mtag to gM. The algorithm employed to select which tag to replace may follow any conventional cache replacement algorithm, e.g., least recently used (LRU), random, first-in-first-out (FIFO), or the like.

The unallocating of tags may, in some cases, be particularly advantageous, especially if the newly requested block is more active than the old one. Thus, the bandwidth on common bus 108 saved on the new requests may exceed the bandwidth consumed in writing the old block's Mtag back to memory module 110.

Section A: Snoop Only approach

In the snoop only approach, each externally cached memory block is tracked in a tag in snoop tag array 250. The externally cached memory block, once tracked, will continue to be tracked until the cached memory block is written back into memory module 110, thereby freeing up the tag to track another externally cached memory block.

When there is a memory access request, e.g., one having a format of memory access request 400 of FIG. 4, on common bus 108, coherence transformer 200 (via coherence transformer link 220) monitors this memory access request and checks address field 404 of the memory access request against the addresses of the memory blocks cached by one of the external devices. With reference to FIG. 10A, this checking is performed, in one embodiment, by comparing address field 404 against the addresses stored in address fields 272(b) of the tags within the tag array 250.

If there is an address match, the state of the matched tag is then checked to ascertain whether the memory block cached by the external device is of the appropriate type to service the outstanding memory access request. This is because an external device may currently have only an invalid copy of a memory block and would therefore be incapable of servicing either a RTO or a RTS memory access request.

If the state of the matched tag indicates that the externally cached memory block is the appropriate copy for servicing the outstanding memory access request, snooping logic 260 of coherence transformer 200 may then set own flag 408 to signify that the default response should be overridden, i.e., memory module 110 should not respond to the outstanding memory access request since there may be a more current copy cached by one of the external devices.

Own flag 408 of memory access request 400, while logically associated with the memory access request, is skewed in time therefrom in one embodiment. In this manner, the own flag may arrive a few cycles later than the rest of the memory access request to allow time for entities, such as coherence transformer 200, to ascertain whether they should respond to the memory access request with a more recent copy of the requested memory block than that available in memory module 110.

Coherence transformer 200 then obtains the appropriate copy of the requested memory block from the external device, using its knowledge of which external device currently holds the most recent copy. Coherence transformer 200 then formulates a response 500 to return the appropriate copy of the requested memory block to common bus 108 to be forwarded to the requesting entity, i.e., one identified by the source ID in the issued memory access request.

As mentioned earlier, whenever memory block 112 is cached by one of the external devices, a tag is employed in tag array 250 of coherence transformer 200 to track the fact that this memory block is being externally cached, and also the external state of that memory block. In this manner, coherence transformer 200 can keep track of which memory block of computer system 100 has been cached by the external devices and (in state field 272(*a*) of the matching tag) which type of copy was actually cached.

When the state in the tag is eI, either the external devices do not have a copy of the requested memory block (even if there is a match between the incoming address and one of the addresses stored in tag array 250) or one of the external devices does have a copy but this memory block is not tracked by snoop tag array 250 since its corresponding Mtag state has already been properly reflected in memory module 110. In this case, the invention advantageously treats the requested memory block as if it is not cached by the external domain, and simply ignore the present memory access request.

If the state in the matching tag is eS, at least one of the external devices has owned a shared, read-only copy of the requested memory block. If the state in the matching tag is eM, one of the external devices owns an exclusive copy of the requested memory block, which it can use to respond to, for example, a RTO memory access request. Further, the external device owning the exclusive copy can unilaterally modify this copy without having to inform other bus entities attached to common bus 108.

The operation of coherence transformer 200 may be more clearly understood with reference to FIGS. 10 and 11. FIG. 10 illustrates, in one embodiment of the present invention, selected transactions performed by coherence transformer 200 in response to memory access requests on common bus 108.

A1. RTO Request on Bus

Referring now to FIG. 10, when a RTO memory access request is issued by one of the bus entities on common bus 108 (as the term is used hereinafter, a "bus entity" refers to any entity such as a processing unit or any other device that is coupled to common bus 108 for sharing a memory block), this RTO memory access request is forwarded to all bus entities, including coherence transformer 200. Coherence transformer 200 then ascertains whether the address of the requested memory block matches one of the addresses stored in tag array 250 of coherence transformer 200.

If there is an address match, the current state of the matching tag is then ascertained to determine whether the copy cached by one of the external devices is of the appropriate type for responding to the memory access request on common bus 108. If the memory access request is a request for an exclusive copy of a memory block (a RTO) or a request for a shared copy of a memory block (a RTS), and the current state of the matching tag is eI (invalid), coherence transformer 200 ignores the present RTO memory access request since the external device either never cached the requested memory block or one of the external devices does have a copy but this memory block is not tracked by snoop tag array 250 since its corresponding Mtag state has already been properly reflected in memory module 110.

If the memory access request on common bus 108 is a RTO (the first RTO of this transaction) and the current tag is eS, coherence transformer 200 needs to invalidate any shared external copy or copies currently cached by one or more of the external devices. This invalidation is illustrated in FIG. 10 by the XINV command, which is a X-protocol invalid command directed at every external device currently having a shared external copy. Following the invalidation, the new state of the memory block in the external device is invalid (New State=eI).

Upon confirmation that the external device has invalidated its shared copy of the requested memory block (via the X-protocol command XINV_ack), coherence transformer 200 then downgrades the state of the matching tag to invalid (New State=eI) to reflect the fact that there is no longer a valid external copy. Coherence transformer 200 then obtains a copy of this requested memory block from computer system 100 and invalidates all internal copies cached by bus entities within computer system 100. Both these actions are accomplished when coherence transformer 200 issues a RTO command (the second RTO of this transaction) to common bus 108 and receives the requested data (via the RTO_data response to the second RTO). The copy of the requested memory block is then sent to common bus 108 to be forwarded to the entity that originally issues the RTO memory access request (via the RTO_data response to the first RTO). In one embodiment, the coherence transformer passes Mtag gM with the final RTO data. Alternatively, the coherence transformer may first update the Mtag in memory module 110 and then respond to the RTO with data.

Note that the use of the XINV command advantageously invalidates all shared copies of the requested memory block cached by the external device(s). Further, the use of the RTO request by coherence transformer 200 to common bus 108 advantageously ensures that all shared copies within computer system 100 are invalidated and obtains the required memory block copy to forward to the requesting entity.

The current state of the matching tag may be an eM when a RTO memory access request appears on common bus 108. The eM state signifies that an external device currently caches an exclusive (and potentially modified) copy of the memory block being requested. In this case, coherence transformer 200 may obtain the exclusive (and potentially modified) copy of the requested memory block from the external device and return that copy to the entity that originally issues the RTO request on common bus 108. In one embodiment, the coherence transformer passes Mtag gM with the final RTO data. Alternatively, the coherence transformer may first update the Mtag in memory module 110 and then respond to the RTO with data.

As shown in FIG. 10, coherence transformer 200 may issue a RTO-like transaction using the X-protocol XRTO transaction to request the exclusive copy of the memory block, which is currently being cached by one of the external devices. If there are multiple external devices coupled to coherence transformer 200, there may be provided with coherence transformer 200 conventional logic, in one embodiment, to allow coherence transformer 200 to determine which external device currently holds the desired exclusive copy of the requested memory block.

The requested copy of the memory block is then returned to coherence transformer 200 from the external device that currently holds it (using the XRTO_data command, which is analogous to the aforementioned RTO_data except accomplished using the X-protocol). Further, the external copy that was previous cached by the external device is downgraded to an invalid copy. This downgrade is tracked in the matching tag in tag array 250, thereby changing the state to eI (New State=eI). After coherence transformer 200 receives the exclusive copy of the requested memory block from the external device that previously cached it, coherence transformer 200 formulates a response to the original RTO, using e.g., using an RTO_data response in a format similar to that shown in FIG. 5, to furnish the requested exclusive copy of the memory block to common bus 108 to be forwarded to the entity that originally issued the RTO memory access request. In one embodiment, the coherence transformer passes Mtag gM with the final RTO data. Alternatively, the coherence transformer may first update the Mtag in memory module 110 and then respond to the RTO with data.

A2. RTS Request on Bus

If the memory access request on common bus 108 represents a request for a shared, read-only copy of a memory block, i.e., a RTS (the first RTS) and the current state of the matching tag is eI (invalid), coherence transformer 200 will ignore the outstanding RTS memory access request even if there is a match between the incoming address and one of the addresses stored in the tags of tag array 250.

On the other hand, if the current state of the matching tag is eS (i.e., one or more of the external devices currently cache shared, read-only copies of the requested memory block), coherence transformer 200 may, in one embodiment, obtain the shared, read-only copy of the requested memory block from computer system 100 itself, e.g., by issuing a RTS request to common bus 108 (the second RTS request). After coherence transformer 100 receives the shared, read-only copy from computer system 100 (via the RTS_data response to the second RTS), it then forwards the copy to common bus 108 to be forwarded to the bus entity that originally issues the RTS command (via the RTS_data response to the first RTS).

If the memory access request on common bus 108 is a RTS and the current state of the matching tag is eM, coherence transformer 200 may obtain the copy of the memory block that is currently exclusively owned by one of the external devices. Further, coherence transformer 200 may downgrade that external copy to a shared copy, and return the data to common bus 108 to be forwarded to the entity that originally issued the RTS memory access request. To accomplish the foregoing, coherence transformer 200 may issue a X-protocol RTS-like transaction (XRTS) to the external device that currently exclusively owns the requested memory block. That external device will return the copy it previously owns as an exclusive copy to coherence transformer 200 (XRTS_data) and also downgrade the external copy from an exclusive copy to a shared copy (New State=eS in the matching tag). When coherence transformer 200 receives the copy of the memory block from the external device, it can forward that copy to common bus 108 (via the RTS_data command) to be forwarded to the entity that originally issue the RTS memory access request. The coherence transformer may then write the data and Mtag gS into memory module 110 with the WB transaction.

A3. WB Request on Bus

If the memory access request on common bus 108 represents a write back (WB) request, i.e., signifying that a bus entity coupled to common bus 108, other than coherence transformer 200, wishes to write back the exclusive copy of the memory block it currently owns. In this situation, the response of coherence transformer 200 depends on the state of the copy of the memory block currently cached by the external device. Generally, the entity that issues the write back memory access request owns the exclusive copy of that memory block, and any copy that may have been cached by an external device earlier must be invalid by the time the write back memory access request is asserted by its owner on common bus 108. Consequently, the current state in the matching tag, if any, should be eI (invalid), in which case coherence transformer 200 does nothing and ignores the outstanding write back transaction on common bus 108.

If, for some reason, the current state of a matching tag is eS or eM, an error condition would be declared since there cannot be another shared or exclusive copy in the network if the write back entity already has an exclusive copy of the memory block. The resolution of this error condition is conventional and may include, for example, flagging the error and performing a software and/or a hardware reset of the system.

Coherence transformer 200 not only interacts with the processing nodes within computer system 100 to respond to memory access requests issued by those processing nodes, it also interacts with the external devices, e.g., one of external devices 202, 204, and 206, in order to service memory access requests pertaining to memory blocks having local physical addresses within computer system 100. FIG. 11 illustrates, in accordance with one embodiment, selected transactions performed by coherence transformer 200 in response to memory access requests from one of the external devices.

In FIG. 11, the memory access requests are issued by one of the external devices, e.g., one of devices 202, 204, or 206, to coherence transformer 200. If another external device currently caches the required copy of the requested memory block, this memory access request may be handled by logic circuitry provided with coherence transformer 200 without requiring the attention of common bus 108.

On the other hand, if another external device does not have the valid copy of the requested memory block to service the external memory access request, coherence transformer 200 then causes a memory access request to appear on common bus 108, using a protocol appropriate to computer system 100, so that coherence transformer 200 can obtain the required copy of the requested memory block on behalf of the requesting external device. With reference to FIG. 9, the snoop-only approach to XRTO, XRTS, and XWB of this section A assumes that there is room in snoop tag array to track the memory block to be externally cached for the entire duration that this memory block is externally cached (step 608 of FIG. 9). If there is not enough room, the invention preferably employs the Mtag-only approach to handle the memory requests externally originated (step 610 of FIG. 9).

In the remaining discussion of section A, since a copy of the memory block is now cached by an external device and serviced in accordance with the snoop-only approach, this memory block is tracked in a tag in tag array 250 of coherence transformer 200.

In one embodiment, the coherence transformer always asserts the own flag on bus transactions for blocks that are externally cached as exclusive or may be externally cached as shared. This advantageously allows the coherence transformer to take more time to correctly handle such requests.

A4. XRTO Request

Referring now to FIG. 11, when an external device issues a memory access request to obtain an exclusive copy of a memory block having a local physical address within computer system 100, e.g., memory block 112(a), coherence transformer 200 first determines whether the address of the requested memory block matches one of the addresses stored in tag array 250 of coherence transformer 200. If there is a match, the current state of the tag that matches the incoming address, i.e., the matching tag, is then ascertained to determine whether an external device, e.g., any of the external devices that couple to coherence transformer 200, has cached a copy of the requested memory block.

If the current state of the matching tag is eI (invalid), coherence transformer 200 proceeds to obtain the requested memory block from common bus 108. This is because a current state invalid (eI) indicates that either none of the external devices currently caches a valid (whether a shared, read-only copy or an exclusive copy) of the requested memory block or that an external device is currently caching a valid copy of the requested memory block but this fact is not tracked in snoop tag array 250 since the Mtag corresponding to the requested memory block has already been properly updated in memory module 10. In this case, the invention advantageously treats the memory block as if it is not cached by one of the external devices, thereby permitting coherence transformer to request this memory block from the internal domain.

Further, since the requested memory block will be cached by the requesting external device, e.g., I/O device 202, after the current memory access request is serviced (since it has already been ascertained in step 606 of FIG. 9 that there is room in snoop tag array 250), this requested memory block needs to be tracked within tag array 250 of coherence transformer 200 so that the next memory access request pertaining to this memory block can be serviced by coherence transformer 200 on behalf of the external device, e.g., I/O device 202, which then has an exclusive (and potentially modified) copy. An unused tag in tag array 250, e.g., one of the tags has a current state invalid or is simply unused, may be employed for tracking the newly cached memory block along with the state of the copy (e.g., eM, eS, or eI). FIG. 11 shows this situation wherein the old tag has state eI.

Referring back to the case in FIG. 11 where there exists a XRTO memory access request from an external device and the current state of the matching tag is eI or there is no tag that matches, coherence transformer 200 acts as another bus entity coupled to common bus 108, i.e., it communicates with common bus 108 using a protocol appropriate to computer system 100 to issue a memory access request for an exclusive copy of the requested memory block. In other words, coherence transformer simply issues a RTO memory access request to common bus 108.

The presence of the request-to-own (RTO) memory access request on common bus 108 causes one of the bus entities, e.g., one of processing nodes 102, 104, and 106, or memory module 110, to respond with the latest copy of the requested memory block (RTO_data transaction in FIG. 11). After coherence transformer 200 receives the exclusive copy of the requested memory block from common bus 108, it then forwards this exclusive copy to the requesting external device using a protocol that is appropriate for communicating with the requesting external device (generalized as the X-protocol XRTO_data command herein). Further, the new state of the tag that tracks this requested memory block is now upgraded to an eM state, signifying that an external device is currently caching an exclusive (and potentially modified) copy of this memory block.

If one of the external devices, e.g., I/O device 202, issues a read-to-own memory access request (using the X-protocol XRTO) for a given memory block and a shared, read-only copy of that memory block has already been cached by a sister external device, e.g., coherent domain device 204, there would already be a tag in tag array 250 for tracking this memory block. However, the state of such tag will reflect an eS copy since the sister external device only has a shared read-only copy. In this case, there is no need to allocate a new tag to track the requested memory block. Coherence transformer must still invalidate all other shared copies of this memory block in computer system 100 and on the sister external devices, as well as upgrade the state of the matching tag to an eM state.

To invalidate the shared copies at the sister external devices, coherence transformer 200 may issue an invalidate command (XINV) to those sister external devices and wait for the acknowledged message (XINV_ack). To invalidate shared, read-only copies of the requested memory block on the bus entities in computer system 100, coherence transformer 200 issues a request-to-own (RTO) memory access request to common bus 108. This RTO command both obtains a copy of the requested memory block (RTO_data transaction) and invalidates the shared, read-only copies cached by the bus entities in computer system 100.

After coherence transformer 200 receives the copy of the requested memory block from common bus 108 (via the RTO_data transaction), coherence transformer 200 may then forward this copy to the requesting external device to service the XRTO memory access request (XRTO_data transaction). Further, the state associated with the matching tag in tag array 250 may be upgraded from an eS (shared) state to an eM (exclusive) state.

If the memory access request received by coherence transformer 200 is a request for an exclusive memory block (XRTO) from an external device and a sister external device is currently caching the exclusive copy of that memory block, logic circuitry provided with coherence transformer 200 preferably obtains the requested memory block from the sister external device to satisfy the XRTO request without requiring the attention of coherence transformer 200 itself As a general rule, if there are more than one external devices, they may, in one embodiment, resolve memory access requests by passing copies of memory blocks among themselves before asking for it from common bus 108 (via coherence transformer 200). On the other hand, if the XRTO memory access request for a memory block comes from an external device that already is currently caching the exclusive copy of the same requested memory block, an error condition exists as shown in FIG. 11. The error condition may be handle using a variety of conventional techniques, e.g., flag the error and/or perform a software or hardware reset. Further, in one embodiment, the coherence transformer could handle XRTO's to externally cache blocks by forwarding requests to sibling devices.

A5. XRTS Request

When an external device issues a memory access request to obtain a shared, read-only copy of a memory block having a local physical address within computer system 100 such as memory block 112(*a*) (via an XRTS command), coherence transformer 200 first determines whether the address of the requested memory block matches one of the addresses stored in tag array 250 of coherence transformer 200. If there is a match, the matching tag is then ascertained to determine whether an external device, e.g., any of the external devices that couple to coherence transformer 200, has cached a copy of the requested memory block.

If the current state of the matching tag is eI (invalid), coherence transformer 200 proceeds to obtain the requested memory block from common bus 108. This is because a current state invalid (eI) indicates that none of the external devices currently caches a valid (whether a shared, read-only copy or an exclusive copy) of the requested memory block or that an external device is currently caching a valid copy of the requested memory block but this fact is not tracked in snoop tag array 250 since the Mtag corresponding to the requested memory block has already been properly updated in memory module 110. In this case, the invention advantageously treats the memory block as if it is not cached by one of the external devices, thereby permitting coherence transformer to request this memory block from the internal domain.

Further, since the requested memory block will be cached by the requesting external device, e.g., I/O device 202, after the current memory access request is serviced, this requested memory block needs to be tracked within tag array 250 of coherence transformer 200 (step 606 already ascertained that there is room for tracking the requested memory block in snoop tag array 250). An unused tag in tag array 250, e.g., one of the tag has a current state invalid or is simply unused, may be employed for tracking the newly cached memory block, along with the state of the copy (i.e., eS).

Referring back to the case in FIG. 11 where there exists a XRTS memory access request from an external device and the current state of the matching tag is eI or there is no tag that matches, coherence transformer 200 may act simply as another bus entity coupled to common bus 108, i.e., it communicates with common bus 108 using a protocol appropriate to computer system 100 to issue a memory access request for a shared, read-only copy of the requested memory block. In other words, coherence transformer simply issues a RTS memory access request to common bus 108.

The presence of the request-to-share (RTS) memory access request on common bus 108 causes one of the bus entities, e.g., one of processing nodes 102, 104, and 106, or memory module 110, to respond with the shared copy of the requested memory block (RTS_data transaction in FIG. 11). After coherence transformer 200 receives the shared, read-only copy of the requested memory block from common bus 108, it then forwards this shared, read-only copy to the requesting external device using a protocol that is appropriate for communicating with the requesting external device (generalized as the X-protocol XRTS_data command herein). Further, the new state of the tag that tracks this requested memory block is now upgraded to an eS state, signifying that an external device is currently caching a shared, read-only copy of this memory block.

If one of the external devices, e.g., I/O device 202, issues a read-to-share memory access request (using the X-protocol XRTS) for a given memory block and a shared, read-only copy of that memory block has already been cached by a sister external device, e.g., coherent domain device 204, there would already be a tag in tag array 250 for tracking this memory block. Further, the state of such tag will reflect an eS copy. In this case, there is no need to allocate a new tag to track the requested memory block.

In one embodiment, logic circuitry associated with coherence transformer 200 may obtain the shared, read-only copy of the requested memory block from the sister external device to satisfy the outstanding XRTO request. In this embodiment, no action on common bus 108 is required. In another embodiment, coherence transformer 200 may obtain the requested shared, read-only copy of the requested memory block from the bus entities in computer system 100 by issuing, as shown in FIG. 11, a request-to-share (RTS) memory access request to common bus 108.

After coherence transformer 200 receives the shared, read-only copy of the requested memory block from common bus 108 (RTS_data transaction), coherence transformer 200 may then forward this copy to the requesting external device to service the XRTS memory access request (XRTS_data transaction). Further, the state associated with the matching tag in tag array 250 is maintained at an eS (shared) state.

If the memory access request received by coherence transformer 200 is a request for a shared, read-only copy of a memory block (XRTS) from an external device and a sister external device is currently caching the exclusive copy of that memory block, logic circuitry provided with coherence transformer 200 preferably obtains the requested memory block from the sister external device (and downgrades the previously existing exclusive copy) to satisfy the XRTS request without requiring the attention of coherence transformer 200 itself On the other hand, if the XRTS memory access request comes from an external device that already is currently caching the exclusive copy of the requested memory block, an error condition exists as shown in FIG. 11. The error condition may be handle using a variety of conventional techniques, e.g., flag the error and/or perform a software or hardware reset.

A6. XWB Request

If the memory access request received by coherence transformer 200 is a write back transaction (X-protocol XWB transaction), i.e., an external device wishes to write back the exclusive copy of a memory block it currently owns, the actions of coherence transformer 200 depends on the state of the copy of the memory block currently cached by the external device. Generally, the external device that issues the write back transaction owns the exclusive copy of that memory block, and the current state of the matching tag in tag array 250 should show an eM (exclusive) state. Consequently, if the current state in the matching tag is eI (invalid) or eS (shared, read-only), an error condition exists as shown in FIG. 11. Again, this error condition may be handle using a variety of conventional techniques, including flagging the error and/or performing a software or hardware reset.

If the current state of the matching tag in tag array 250 is an eM (exclusive) state, coherence transformer 200 proceeds to receive the data to be written back (via the X-protocol XWB_data command) and issues a WB memory access request to common bus 108, to be followed up by the data (WB_data) (and also sets the Mtag to gM). Further, the external copy of the requested memory block is downgraded accordingly from an exclusive copy to an invalid copy (New State=eI).

To further clarify the details regarding the generalized X-protocol, which is employed by coherence protocol 200 in communicating with each external device, Tables 1 and 2 illustrate selected X-protocol requests and X-protocol responses. It should be borne in mind that Tables 1 and 2 are shown for illustration purposes only and other requests and responses may also be provided depending on needs. As mentioned earlier, the adaptation of the disclosed generalized X-protocol transactions to work with a specific external coherence domain will depend greatly on the specification of the protocol employed by the specific external device and is generally within the skills of one skilled in the art.

In Table 1, the X-protocol requests, the actions represented by the requests, and possible responses thereto are shown. In Table 2, the X-protocol responses and the actions represented by the responses are shown. Table 2 further specifies whether a given response will be accompanied by data.

TABLE 1

| REQUEST | ACTION | POSSIBLE RESPONSES |
|---------|--------|--------------------|
| XRTO | Get exclusive copy of memory block | XRTO_data, XRTO_nack |
| XRTS | Get shared, read-only copy of memory block | XRTS_data, XRTS_nack |
| XINV | Invalidate copy of memory block | XINV_ack |
| XWB | Request to write back currently cached exclusive copy of memory block | XWB_ack, XWB_nack |

TABLE 2

| RESPONSES | ACTION | DATA? |
|---|---|---|
| XRTO_data | Reply with exclusive copy of memory block | Y |
| XRTO_nack | Not acknowledged, retry XRTO progenitor | N |
| XRTS_data | Reply with shared copy of memory block | Y |
| XRTS_nack | Not acknowledged, retry XRTS progenitor | N |
| XINV_ack | acknowledged | N |
| XWB_ack | acknowledged, permitting XWB_data | N |
| XWB_data | write back with exclusive copy of memory block | Y |

Advantageously, the use of a coherence transformer and the tightly-coupled request-response transactions permit external devices, which may employ protocols different from the protocol on common bus 108 of computer system 100 to share memory blocks which have local physical addresses within computer system 100. Further, the explicit handshaking provided by the tightly coupled request-response pairs makes this sharing possible even if the external devices may each be operating at a different operating speed from that on common bus 108.

In a system in which coherence transformer 200 facilitates such memory block sharing, there is essentially no effect on system performance within computer system 100 when an external device does not cache a memory block. When an external device caches fewer memory blocks then there are tags in tag array 250 of coherence transformer 200, the effect on the overall system performance is fairly minimal. This is because when there are fewer externally-cached memory blocks than there are available tags in tag array 250, no additional transactions employing common bus 108, i.e., those associated with the Mtag-only approach to allow external devices to cache memory blocks without tracking them in snoop tag array 250.

The latency in responding to outstanding memory access requests on common bus 108 is due in part from the delay required for coherence transformer 200 to examine tags in tag array 250 to determine whether coherence transformer 200 should intervene to service a memory access request on common bus 108.

Section B: Mtag-only approach:

In the Mtag-only approach, i.e., the approach taken by steps 508 of FIG. 8 and 610 of FIG. 9), an externally originated memory access request can be serviced even though there is no room in snoop tag array 250 for tracking the externally cached memory block for the duration it is externally cached.

FIGS. 12 and 13 show, in one embodiment of the Mtag-only approach, the memory access requests and responses issued by a bus entity, e.g., any of the entities coupled to common bus 108 such as processing units 102, 104, 106 or coherence transformer 200. In the description that follows, it is assumed for simplicity of illustration that there is only one bus entity internal to computer node 100, e.g., processing unit 102, being coupled to common bus 108. If there are more than one internal bus entities coupled to common bus 108, e.g., both processing units 102 and 104 are present on common bus 108, the resolution of coherence problems among, these internal bus entities may be resolved using any conventional method.

By way of example, one solution to such coherence problems involves requiring each internal bus entity to snoop bus 108. If the snooped memory access request involves a memory block whose latest copy is cached by that internal bus entity, that internal bus entity may intervene to respond to the outstanding memory access request before memory module 110 may respond. An internal bus entity may ignore an outstanding memory access request if the request does not involve a memory block cached by that internal bus entity. If no internal bus entity intervenes, memory module 110 is implicitly responsible for responding with the copy it currently possesses.

Referring now to FIGS. 12 and 13, a bus entity, e.g., processing node 102, may issue a memory access request for an exclusive copy of memory block 112(a) by issuing a request to own (RTO) request. In the description that follows, a request may have the form of request 400 of FIG. 5. On the other hand, a response may have the form of response 500 of FIG. 6.

If no other internal bus entities intervenes responsive to the RTO request, memory module 110 may respond to the outstanding RTO request with a RTO_data to furnish the RTO progenitor with a copy of the requested memory block from memory module 110, along with the state of that memory block (i.e., the content of the associated Mtag). Coherence transformer 200, as a bus entity, may not intervene if there is not a match between the requested memory block and one of the memory blocks tracked by tags in snoop tag array 250. If the RTO request is erroneous, e.g., requesting a non-existent memory block, memory module 110 may reply with a RTO-nack response, signifying that the RTO request is not acknowledged and needs to be retried by the RTO progenitor.

Once the RTO_data response is received by the RTO progenitor from memory block 110, i.e., by processing unit 102 in this example, the RTO progenitor then examines the state of the enclosed Mtag to determine whether the current copy of the memory block received from memory module 110 can be employed to service the issued RTO request. If the state is gI, for example, it is understood that an external device currently has the exclusive copy of the memory block, and the RTO progenitor may issue a request to obtain that copy and invalidate all external copies via the remote RTO memory access request (RRTO). Details regarding the RTO and RRTO requests, as well as other requests described herein, are discussed more fully herein, particularly with reference to FIG. 12.

If the Mtag state is gS, at least one external bus entity had a shared, read-only copy. In this case, it will be necessary to invalidate all shared copies existing internally and externally, and respond to the outstanding RTO request with the latest copy. If the state is gM, one of the internal entities has the latest valid copy and the RTO progenitor may proceed to employ the data returned in the RTO_data response from memory module 110 to satisfy its RTO needs (since it is assumed herein that there is no other internal entity to intervene with a later copy).

A remote RTO (RRTO) memory access request is typically issued by a RTO progenitor after that RTO progenitor finds out, by ascertaining the state of the Mtag received from memory module 110, that the state of the Mtag is insufficient to service the current RTO request. Insufficient Mtag states in this case may be gS or gI, i.e., there may be a shared or exclusive copy of the requested memory block existing externally. If the RRTO is issued by the RTO progenitor responsive to a gM Mtag, coherence transformer 200 understands this to be an error condition (since state gM indicates that the internal domain, not the external domain, currently has the exclusive copy of the requested memory block) and may request the RRTO progenitor to retry to obtain the exclusive copy from the internal domain.

If the RRTO is issued by the RTO progenitor responsive to a gS Mtag, coherence transformer 200 may respond to this RRTO command by invalidating external shared copy or copies, obtaining the latest copy of the requested memory block either from the external domain or the internal domain, invalidating all internal shared copy or copies, and returning that copy to the RRTO progenitor via the RTOR__ data response. If the RRTO is issued by the RTO progenitor responsive to a gI Mtag, coherence transformer 200 may respond to this RRTO command by obtaining the external exclusive copy, invalidating that external exclusive copy, and returning that copy to the RRTO progenitor via the RTOR_data response. Further, coherence transformer 200 may perform a write back to memory module 110 to change the state of the Mtag corresponding to the requested memory block to gM via the RTOR response. If the RRTO request is erroneous, e.g., requesting a non-existent memory block, coherence transformer 200 may reply with a RTOR__nack response, signifying that the RRTO request is not acknowledged and needs to be retried by the RRTO progenitor.

A bus entity, e.g., processing node 102, may issue a memory access request for a shared, read-only copy of memory block 112(a) by issuing a RTS request. If no other internal bus entities intervenes, memory module 110 may respond to the outstanding RTS request with a RTS_data to furnish the RTS progenitor with a copy of the requested memory block from memory module 110, along with the state of that memory block (i.e., the content of the associated Mtag). Coherence transformer 200, as a bus entity, may not intervene if there is not a match between the requested memory block and one of the memory blocks tracked by tags in snoop tag array 250. If the RTS request is erroneous, e.g., requesting a non-existent memory block, memory module 110 may reply with a RTS-nack response, signifying that the RTS request is not acknowledged and needs to be retried by the RTS progenitor.

Once the RTS_data response is received by the RTS progenitor from memory block 110, i.e., processing unit 102 in this example, the RTS progenitor then examines the state of the enclosed Mtag to determine whether the current copy of the memory block received from memory module 110 can be employed to service the current RTS need. Generally, if the state of the Mtag is gS, at least one internal bus entity currently has a shared, read-only copy and this RTS memory access request can be serviced either by another internal bus entity or by the data received from memory module 110 itself. If the state of the Mtag is gM, at least one internal bus entity currently has an exclusive copy and this RTS memory access request can be serviced either by another internal bus entity or by the data received from memory module 110 itself.

If the state is gI, it is understood that an external device currently has the exclusive copy of the memory block and the RTS progenitor may issue a request to obtain that copy via the remote RTS memory access request (RRTS). If for some reason the RRTS is issued by the RTS progenitor responsive to a gM or gS Mtag, coherence transformer 200 understands this to be an error condition and will request the RTS progenitor to retry to obtain the shared copy from the internal bus entities. If the RRTS is issued by the RTS progenitor responsive to a gI Mtag, coherence transformer 200 may respond to this RRTS command by obtaining the shared copy of the requested memory block from the external device and returning that copy to the RRTS progenitor via the RTSR_data response. Further, coherence transformer 200 performs a write back to memory module 110 to change the state of the Mtag corresponding to the requested memory block to gS (via the RTSR response). If the RRTS request is erroneous, e.g., requesting a non-existent memory block, coherence transformer 200 may reply with a RTSR__nack response, signifying that the RRTS request is not acknowledged and needs to be retried by the RRTS progenitor.

Either one of the processing nodes, e.g., processing node 102, or coherence transformer 200 (on behalf of an external device) may issue a write back (WB) request to write back to memory 110 an exclusive copy of a memory block it earlier cached. If the WB request is erroneous, e.g., requesting a non-existent memory block, memory module 110 may reply with a WB__nack response, signifying that the WB request is not acknowledged and needs to be retried by the WB progenitor.

On the other hand, if no WB__nack response is issued, the WB progenitor may follow up with a WB_data response to write back the memory block to memory module 110. Further, the state of the Mtag in memory module 110 may also be changed to gM (if coherence transformer 200 requests the write back) to reflect the fact that the internal domain now has the exclusive copy of this memory block.

As mentioned earlier, when there is a remote memory access request, e.g., an RRTO or a RRTS, on common bus 108, coherence transformer 200 (via coherence transformer link 220) receives this memory access request and formulates an appropriate response depending on the state of the Mtag. The operation of the coherence transformer 200 may be more clearly understood with reference to FIGS. 14 and 15.

FIG. 14 illustrates, in one embodiment of the present invention, selected transactions performed by coherence transformer 200 in response to remote memory access requests on common bus 108. Referring now to FIG. 14, when a remote memory access request is issued by one of the internal bus entities on common bus 108, this remote memory access request is forwarded to all bus entities, including coherence transformer 200. The remote request may be, however, ignored by all internal bus entities, e.g., processor 102. Responsive to the remote request, coherence transformer 200 ascertains the current state of the Mtag (included in the remote request) to determine whether one of the external devices has an appropriate copy of the requested memory block for responding to the remote memory access request on common bus 108. The ascertaining of the Mtag state is necessary since it has been determined, in step 504 of FIG. 8, that there is no match between the requested memory block and one of the memory blocks tracked in snoop tag array 250.

B1. Remote Request to Own (RRTO)

If the remote memory access request is a request for an exclusive copy of a memory block (a RRTO) and the current Mtag state is gM, coherence transformer 200 understands this to be an error condition (since state gM indicates that the internal domain, not the external domain, currently has the exclusive copy of the requested memory block) and may request the RRTO progenitor to retry to obtain the exclusive copy from the internal domain.

On the other hand, the RRTO may be issued by the RTO progenitor in response to a gS or a gI Mtag. This occurs when the external domain is currently caching a valid copy of the requested memory block and there is no room in snoop tag array 250 for tracking this externally cached memory block. Consequently, coherence transformer 200 would not be able to intervene to respond when the original RTO (issued by the RTO progenitor pertaining to this memory block) was present on common bus 108. With reference to FIG. 8, coherence transformer 200 finds no tag match in step 504 and proceeds to let memory module 110 respond (in step 508 of FIG. 8 in accordance with the Mtag-only approach).

If the RRTO is issued by the RTO progenitor responsive to a gS Mtag, coherence transformer 200 may respond to this RRTO command by invalidating external shared copy or copies by issuing the X-protocol invalidate command XINV to request all external devices to invalidate their shared copies. Coherence transformer 200 may either broadcast the X-protocol commands or may simply direct the X-protocol command to the appropriate external device(s) if there is provided logic with coherence transformer 200 for keeping track of the locations and types of memory blocks cached.

When all external copies have been invalidated (confirmed by the receipt of the X-protocol XINV_ack response) coherence transformer 200 may then obtain the latest copy of the requested memory block from the internal domain and invalidate all internal shared copy or copies. In one embodiment, coherence transformer 200 may obtain the latest copy of the requested memory block from the internal domain and invalidate all internal shared copy or copies by issuing a RTO request to common bus 108. Upon receiving the requested copy from the internal domain (via the RTO_data response), coherence transformer 200 may write back the copy to memory module 110 along with the appropriate Mtag, i.e., gM in this case, via the RTOR response. Thereafter, coherence transformer 200 may provide the requested copy to the RRTO progenitor via the RTOR_data response.

Note that the use of the XINV command advantageously invalidates all shared copies of the requested memory block cached by the external device(s). Further, the use of the RTO request by coherence transformer 200 to common bus 108 advantageously ensures that all internal shared copies within computer node 100 is invalidated and obtains the required memory block copy to forward to the requesting entity, i.e., the RRTO progenitor.

If the RRTO request is issued by the RTO progenitor responsive to a gI Mtag, coherence transformer 200 may respond to this RRTO command by obtaining the external exclusive copy and invalidating that external exclusive copy via the X-protocol XRTO request. When the external exclusive copy is obtained (via the X-protocol XRTO_data response), coherence transformer 200 may perform a write back to memory module 110 to change the state of the Mtag corresponding to the requested memory block to gM via the RTOR response. Further, coherence transformer 200 may return the copy of the requested memory block to the RRTO progenitor via the RTOR_data response.

B2. Remote Request to Share (RRTS)

If the remote memory access request is a request for a shared copy of a memory block (a RRTS) and the current state of the Mtag is gM or gS, coherence transformer 200 understands this to be an error condition (since these states indicate that there is at least one valid, i.e., shared or exclusive, copy internally) and will request the RTS progenitor to retry to obtain the shared copy from the internal bus entities. If the RRTS is issued by the RTS progenitor responsive to a gI Mtag, coherence transformer 200 may respond to this RRTS command by obtaining the shared copy of the requested memory block from the external device (via the X-protocol XRTS request). When the external shared copy is obtained (via the X-protocol XRTS_data response), coherence transformer 200 may perform a write back to memory module 110 to change the state of the Mtag corresponding to the requested memory block to gS via the RTSR response. Further, coherence transformer 200 may return the copy of the obtained memory block to the RRTS progenitor via the RTSR_data response.

Coherence transformer 200 not only interacts with the processing nodes within computer nodes 100 to respond to remote memory access requests issued by those processing nodes, it also interacts with the external devices, e.g., external devices 202, 204, and 206, in order to service memory access requests pertaining to memory blocks having local physical addresses within computer node 100.

FIG. 15 illustrates selected transactions performed by coherence transformer 200 in response to memory access requests from one of the external devices. In FIG. 15, the memory access requests are issued, using the aforementioned generalized X-protocol, by one of the external devices, e.g., one of devices 202, 204, or 206, to coherence transformer 200. If another external device currently caches the required copy of the requested memory block, this memory access request is preferably handled by logic circuitry provided with coherence transformer 200 without requiring the attention of coherence transformer 200 itself.

On the other hand, if another external device does not have the valid copy of the requested memory block to service the memory access request, coherence transformer 200 then causes a memory access request to appear on common bus 108, using a protocol appropriate to computer node 100, so that coherence transformer 200 can obtain the required copy of the requested memory block on behalf of the requesting external device. Further, since a copy of the memory block is now cached by an external device, and it has been determined in step 606 of FIG. 9 that there is no additional room in snoop tag array 250 to track this externally requested memory block for the entire duration of it being externally cached, the Mtag associated with this memory block may need to be changed in memory module 110 to reflect this change, i.e., the invention proceeds to handle this externally originated memory access request using the Mtag-only approach.

B3. XRTO Memory Access Request

Referring now to FIG. 15, when an external device issues a memory access request to obtain an exclusive copy of a memory block having a local physical address within computer node 100, e.g., memory block 112(*a*), it issues a XRTO request to coherence transformer 200. Coherence transformer 200 then obtains the copy of the requested memory block from the internal domain and invalidates all internal copies of the request memory block (by issuing a RTO request to common bus 108). After receiving the copy of the requested memory block, coherence transformer 200 then ascertains the state of the associated Mtag to determine its next course of action.

If the state of the Mtag (contained in the RTO_data response) is gI, coherence transformer 200 understands this to be an error since the external domain does not have the exclusive copy (otherwise it would not need to request the exclusive copy from the internal domain) and the internal domain does not have either a shared or exclusive copy (gI Mtag state). The error condition may be handled using a variety of conventional techniques, e.g., flag the error and/or perform a software or hardware reset.

On the other hand, if the state of the Mtag is gM or gS, coherence transformer 200 then writes back to memory module 110 (via the WB request and WB_data response) the new state, i.e., gI, to signify that there is no longer a valid copy of the requested memory block in the internal domain.

In one embodiment, the write back may be performed with only the new state gI and without any other data for the requested memory block to save bandwidth on common bus 108 (since any data associated with an invalid Mtag state would be ignored anyway). Thereafter, coherence transformer 200 may forward the copy of the obtained memory block to the requesting external device via the X-protocol XRTO_data response.

B4. XRTS Memory Access Request

When an external device issues a memory access request to obtain a shared copy of a memory block having a local physical address within computer node 100, e.g., memory block 112(a), it issues a XRTS request to coherence transformer 200. Coherence transformer 200 then obtains the copy of the requested memory block from the internal domain and writes the gS state to memory module 110 (by issuing a RTSM request to common bus 108 and receives the RTSM_data response). If the state of the Mtag is gI, coherence transformer 200 typically would receive a response from the memory module with Mtag gI. If the response is received and the Mtag state contained in the RTSM_data response is gI or, for some reason, there is no response, coherence transformer 200 understands this to be an error since the external domain does not have the exclusive copy (otherwise it would not need to request the exclusive copy from the internal domain) and the internal domain does not have either a shared or exclusive copy (gI Mtag state). The error condition may be handled using a variety of conventional techniques, e.g., flag the error and/or perform a software or hardware reset.

On the other hand, if the state of the Mtag is gM or gS, coherence transformer 200 may forward the copy of the obtained memory block to the requesting external device via the X-protocol XRTS_data response.

Note that the RTSM and RTSM_data sequence may equally be substituted by a sequence containing RTO (from coherence transformer 200 to common bus 108), RTO_data (from common bus 108 to coherence transformer 200), WB (from coherence transformer 200 to common bus 108 to ask permission to write to memory module 110), and WB_data (writing the gS Mtag to the corresponding memory block in memory module 110.

B5. XWB Request

When an external device issues a request to write back an exclusive copy of a memory block it earlier cached from computer node 100, it issues a X-protocol XWB request to coherence transformer 200. In accordance with the Mtag-only approach, coherence transformer 200 may then obtain a copy of the requested memory block from the internal domain to ascertain the current state of the associated Mtag. If the current state is gM or gS, coherence transformer 200 understands this to be an error since the external domain, which requests to write back, must have the only valid, exclusive copy and there must be no other valid (whether exclusive or shared) copy of the same memory block anywhere else in the computer system. The error condition may be handled using a variety of conventional techniques, e.g., flag the error and/or perform a software or hardware reset.

On the other hand, if the state of the Mtag is gI, coherence transformer 200 then proceeds to receive from the external device the data to be written back (via the X-protocol XWB_data response) and writes this data, along with the new gM Mtag state, to the appropriate memory location in memory module 110. In one embodiment, the writing of both the data and the gM Mtag state can be accomplished by issuing a WSgM command to common bus 108, which requests the writing of both data and new Mtag, to be followed by the data and the new gM Mtag in the WSgM_data command.

Note that the WSgM and WSgM_data sequence may well be substituted by a sequence containing RTO (from common bus 108 on behalf of memory module 110 to coherence transformer 200), RTO_data (from coherence transformer 200 to common bus 108 to furnish the old data be overwritten from memory module 110), WB (from 5 coherence transformer 200 to common bus 108 to ask permission to write to memory module 110), and WB_data (writing the gM Mtag to the corresponding memory block in memory module 110).

In accordance with the Mtag-only approach, the use of a coherence transformer and the tightly-coupled request-response transactions, advantageously permit external devices, which may be employing protocols different from the protocol on common bus 108 of computer node 100, to share memory blocks having local physical addresses within computer node 100. Further, coherence transformer 200 makes this sharing possible even if the external devices may each be operating at a different operating speed from that on common bus 108.

Note that the external devices do not need to accommodate Mtags to participate in memory sharing. Only the bus entities, e.g., memory module 110, the processors coupled to common bus 108, and coherence transformer 200, need to be aware of the existence of Mtags to employ them in avoiding coherence problems. Consequently, this feature of coherence transformer 200 advantageously permits a properly configured computer node 100 to work with a wide range of existing external devices to facilitate memory sharing without requiring any modification to the external devices.

The Mtag-only approach advantageously permits the external devices to cache any number of memory blocks. Due to the existence of Mtags, coherence transformer 200 advantageously does not need to keep track of every memory block currently cached by the external devices for the purpose of deciding whether coherence transformer 200 should intervene in servicing a memory access request on common bus 108. This is in contrast with the snoop-only approach, which requires a tag to track every externally cached memory block and which is employed herein only when there is still room in snoop tag array 250 to track the externally cached memory blocks. When there is no more room in snoop tag array 250 to track the externally cached memory blocks, the Mtag-only approach can advantageously be employed to facilitate the caching of memory blocks by external devices in a coherent manner.

In accordance with one aspect of the inventive Mtag-only approach, the bus entity that obtains the memory block from memory module 110 decides for itself, upon ascertaining the Mtag state of the obtained memory block, whether it needs to further request a more recent copy from the external device (via the remote requests RRTO and RRTS directed at coherence transformer 200).

In one embodiment, coherence transformer 200 in the Mtag-only approach is provided with at least one buffer block, e.g., buffer 280 of FIG. 7A, for temporarily storing a copy of the memory block most recently accessed by one of the external device. The buffer block may store both the address of the memory block and the relevant Mtag data (or alternatively the external states eS, eI, or eM since Mtags and external states can be derived from one another). The buffer block advantageously permits coherence transformer 200 to perform write back to memory module 110 to change the state of the Mtag in memory module 110.

While operating in the Mtag-only approach, in the interval after coherence transformer 200 obtains the copy of the memory block requested and before coherence transformer 200 performs a write back to change the Mtag, e.g., responsive to a XRTO request from an external device, coherence transformer 200 may, using the data stored in the buffer, monitor common bus 108 to intervene. The intervention may be necessary if, for example, another internal bus entity requests this memory block during the aforementioned interval.

Note that once the write back is performed to change the Mtag to the appropriate state, it is no longer necessary to keep a copy of that memory block in the buffer. Because a copy of a memory block is typically kept in a buffer for a very short time, the number of buffers required may be quite small.

Further, since a response to an externally-originated memory access request, e.g., XRTO, XRTS or XWB, requires knowledge of the state of the corresponding Mtag, there is optionally provided, as an optimization technique in one embodiment, a Mtag cache array for tracking some or all memory blocks of memory module 110. For example, a Mtag cache array may be provided to track only the Mtag states of the memory blocks externally cached. Alternatively, a Mtag cache array may be employed to track the Mtag states of every memory block in memory module 110.

As another embodiment, an Mtag cache array may be provided to track only memory blocks whose Mtag states are gS and gI. This embodiment is particularly advantageous in computer systems in which a relatively small number of memory blocks are externally cached at any given time. In such a computer system, most memory blocks would have a gM state, and relative few would have gS and gI Mtag states When coherence transformer 100 requires knowledge of the Mtag state associated with a given memory block, it checks the Mtag cache array first. In case of a cache hit, no bandwidth of common bus 108 is required to ascertain the Mtag state. In case of the cache miss, coherence transformer 200 may proceed to inquire, via common bus 108 as discussed herein, the state of the associated Mtag to determine its proper course of action. Note that the presence of a Mtag cache array is not absolutely necessary and is equally well to have an implementation wherein no Mtag caching is performed (in which case coherence transformer inquires, via common bus 108, the Mtag state when it needs this information).

As is apparent from the foregoing, when there is sufficient room in snoop tag array 250 of snoop coherence transformer 200 to keep track of externally cached memory blocks, the invention advantageously operates in the snoop-only mode. In this mode, the performance of the hybrid approach described herein is as efficient as that of the snoop techniques. Note that in the snoop-only approach, when an external device caches a memory block, there is advantageously no need to write back to memory module 110 the new Mtag. In this manner, common bus 108 is only employed once to furnish the requested memory block to coherence transformer 200 to service the externally originated memory access request, and there is no need to use common bus 108 again to write the new Mtag to memory module 110, as would be required in the Mtag-only approach.

When there is no room left in snoop tag array 250 to keep track of externally cached memory blocks, the invention advantageously switches to the Mtag-only approach. In this approach, there is no need to track the externally cached memory block in snoop tag array 250.

Although additional bandwidth on common bus 108 is required to write back the new Mtag state to memory module 110, the Mtag-only approach is still an advantageous mode of operation when there is no room left in snoop tag array 250. This is because the Mtag-only approach, unlike the snoop approach, does not require the forcible write back of a memory block that is externally cached previously for the purpose of freeing up a tag in snoop tag array 250 in order to track the newly cached memory block. The forcible write back of a memory block that is externally cached earlier is a time consuming operation since snoop coherence transformer 200 must decide which of the multiple memory blocks externally cached should be written back, and must go out to the external device to invalidate the externally cached copy before writing it back to memory module 110. Such an action is required in the snoop-only approach whenever there is no more tag in snoop tag array 250 since the snoop only approach requires that each externally cached memory block be tracked by a tag in snoop tag array 250, and unless a forcible write back is performed on a memory block that is externally cached previously to unallocate a tag, there is no tag in snoop tag array 250 to service the new externally requested memory block.

As is apparent, the exact number of tags in snoop tag array 250 depends on the needs of a particular system. In general, as many tags as reasonably possible should be provided in snoop tag array 250 to defer the need to operate in the Mtag-only approach. Note that the tags are recycled since when an external device writes back a memory block that is tracked in snoop tag array 250, the tag that is employed to track this externally cached memory block is then freed up, allowing coherence transformer 200 to service the next externally originated memory access request using the snoop-only approach.

Note that the invention, with a finite number of tags in snoop tag array 250, takes advantage of the optimum operating range of the snoop approach while avoiding its less efficient operating point. The invention advantageously operates in the optimum operating range of the snoop approach when there are tags in snoop tag array 250 to track externally cached memory blocks, thereby avoiding the inefficiency associated with the Mtag-only approach in this operating range (i.e., the need of the Mtag approach to write the Mtag back to memory module 110).

When there are no more tags in snoop tag array 250 to track externally cached memory blocks, the invention advantageously avoids the more inefficient operating mode associated with the snoop approach for this operating range (i.e., the mode wherein forcible write backs of memory blocks externally cached in previous cycles are necessitated). In this operating range, the invention advantageously switches to an Mtag-only operating mode, thereby allowing the system to operate at a relatively higher efficiency.

The invention has been described as allowing one coherence transformer per bus. System designers may, in some cases, want to attach several coherence transformers to a bus to connect many alternative device of the same or different types, e.g. I/O devices, DSM memory agents, coherence domain devices, and the like. The implementation of multiple coherence transformers would be apparent to those skilled in the art given this disclosure. In a multiple coherence transformer implementation, Mtags may be extended with a field to identify which coherence transformer has the block externally so that processors know which coherence transformer should receive the appropriate RRTO's and RRTS's.

While this invention has been described in terms of several preferred embodiments, there are alterations, permutations, and equivalents which fall within the scope of this invention. It should also be noted that there are many alternative ways of implementing the methods and apparatuses of the present invention. By way of example, some systems may crate an illusion of a common bus without requiring a physical bus (e.g., via a set of broadcast wires). The KSR-1 from Kendall Square Research of Massachusetts is one such example. The present invention applies equally well to these and other analogous systems. It is therefore intended that the following appended claims be interpreted as including all such alterations, permutations, and equivalents as fall within the true spirit and scope of the present invention.

What is claimed is:

1. In a computer system having a computer node which has a common bus, a method for enabling an external device in an external domain that is external to said computer node to share memory blocks having local physical addresses in a memory module at said computer node irrespective whether said external device and said common bus both employ a common protocol and irrespective whether said external device and said common bus both operate at the same speed, each of said memory blocks having an associated Mtag for tracking a global state associated with said each of said memory block, including a global exclusive state for indicating that said each of said memory blocks is exclusive to said computer node, a global shared state for indicating that said each of said memory blocks is shared by said computer node with said external device, and a global invalid state for indicating that said each of said memory blocks is invalid in said computer node, said method comprising:

receiving through a coherence transformer that is coupled to said common bus, a first memory access request for a first memory block from said external device;

obtaining a first copy of said first memory block, using said coherence transformer, from said common bus, said coherence transformer having a snoop tag array having a plurality of snoop tags, each of said plurality of snoop tags being configured to track an external state of a copy of one of said memory blocks if cached by said external device, said external state including one of an external exclusive state for indicating that said copy of one of said memory blocks is exclusive to said external domain, an external shared state for indicating that said copy of one of said memory blocks is shared by said external domain, and an external invalid state for indicating that said copy of one of said memory blocks is invalid in said external domain;

if at least one tag in said plurality of snoop tags is available for tracking said external state of said first copy of said first memory block, responding to said first memory access request using a snoop-only approach by tracking said external state of said first copy of said first memory block using said at least one tag;

else if at least one tag in said plurality of snoop tags is not available for tracking said external state of said first copy of said first memory block, responding to said first memory access request using an Mtag-only approach by modifying a first Mtag associated with said first memory block in said memory module at said computer node using said coherence transformer to reflect that said external device is caching said first copy of said first memory block; and sending said first copy of said first memory block from said coherence transformer to said external device.

2. The method of claim 1 wherein said first memory access request from said external device represents a request for an exclusive copy of said first memory block and said step of responding to said first memory access request using said Mtag-only approach further includes a step of changing said first Mtag in said memory module to a global invalid state.

3. The method of claim 2 wherein said step of responding to said first memory access request using said Mtag-only approach further comprising a step of invalidating all valid copies of said first memory block at said computer node.

4. The method of claim 1 wherein said first memory access request from said external device represents either a request for an exclusive copy of said first memory block or a request for a shared copy of said first memory block, said step of responding to said first memory access request using said Mtag-only approach further includes the steps of:

prior to said modifying step, examining said first Mtag associated with said first memory block; and proceeding with said modifying step and said sending step only if said first Mtag does not represent a global invalid state.

5. The method of claim 1 wherein said first memory access request from said external device represents a request for a shared copy of said first memory block and said step of responding to said first memory access request using said Mtag-only approach further includes a step of changing said first Mtag in said memory module to a global shared state.

6. The method of claim 5 wherein said step of responding to said first memory access request using said Mtag-only approach further includes the steps of:

prior to said modifying step, examining said first Mtag associated with said first memory block;

proceeding with said modifying step and said sending step only if said first Mtag does not represent a global invalid state; and if said first Mtag represents a global invalid state, flagging an error condition.

7. The method of claim 1 further comprising the steps of:

receiving a write back request for a second memory block from said external device at said coherence transformer;

obtaining said first copy of said second memory block, using said coherence transformer, from said external device;

writing said first copy of said second memory block from said coherence transformer to said memory module at said computer node; and if said first copy of said first memory block is not tracked in a snoop tag of said snoop tag array, modifying, using said coherence transformer, an Mtag associated with said second memory block in said memory module at said computer node to reflect that said computer node has an exclusive copy of said second memory block.

8. The method of claim 1 wherein said global state for said each of said memory blocks is employed as said external state for said each of said memory blocks, whereby a global exclusive state represents an external invalid state, a global shared state represents an external shared state, and a global invalid state represents an external exclusive state.

9. The method of claim 1 further comprising the steps of:

receiving a writeback request for said first memory block from said external device at said coherence transformer;

obtaining said first copy of said first memory block, using said coherence transformer, from said external device;

writing said first copy of said first memory block from said coherence transformer to said memory module at said computer node; and if said first copy of said first memory block was tracked in a snoop tag of said snoop tag array prior to said writing step, unallocating said snoop tag of said snoop tag array, thereby rendering said snoop tag available for tracking other externally cached memory blocks and causing said first copy of said first memory block to be no longer tracked by said snoop tag array.

10. The method of claim 1 further comprising the step of responding, through said coherence transformer, to a second memory access request on said common bus on behalf of said external device, comprising:

monitoring memory access requests on said common bus, using said coherence transformer, to determine whether a second memory access request of said memory access requests on said common bus pertains to any one of memory blocks tracked in snoop tags of said snoop tag array; and if said second memory access request pertains to a second memory block, said second memory block representing said one of memory blocks tracked in said snoop tags of said snoop tag array, responding to said second memory access request using said snoop-only approach, including responding to said second memory access request using said coherence transformer.

11. The method of claim 10 wherein said coherence transformer responds to said second memory access request in said snoop-only approach only if a snoop tag tracking said second memory block in said snoop tag array indicates that a first copy of said second memory block is valid at said external device.

12. The method of claim 11 wherein said second memory access request is a request for an exclusive copy and said snoop tag tracking said second memory block indicates that said first copy of said second memory block at said external device is an exclusive copy of said second memory block, said step of responding to said second memory access request using said snoop-only approach comprises:

obtaining, using said coherence transformer, a second copy of said second memory block from said first copy of said second memory block at said external device;

invalidating said first copy of said second memory block at said external device; and forwarding said second copy of said second memory block from said coherence transformer to said common bus to enable a progenitor of said second memory access request to obtain said second copy of said second memory block; and unallocating said snoop tag of said snoop tag array, thereby rendering said snoop tag available for tracking other externally cached memory blocks and causing said second memory block to be no longer tracked by said snoop tag array.

13. The method of claim 11 wherein said second memory access request is a request for an exclusive copy and said snoop tag tracking said second memory block indicates that said first copy of said second memory block at said external device is a shared copy of said second memory block, said step of responding to said second memory access request using said snoop-only approach comprises:

invalidating said first copy of said second memory block at said external device;

obtaining, using said coherence transformer, a second copy of said second memory block from said computer node via said common bus;

invalidating, using said coherence transformer, any valid copy of said second memory block in said computer node; and forwarding said second copy of said second memory block from said coherence transformer to said common bus to enable a progenitor of said second memory access request to obtain said second copy of said second memory block; and unallocating said snoop tag of said snoop tag array, thereby rendering said snoop tag available for tracking other externally cached memory blocks and causing said second memory block to be no longer tracked by said snoop tag array.

14. The method of claim 11 wherein said second memory access request is a request for a shared copy and said snoop tag tracking said second memory block indicates that said first copy of said second memory block at said external device is a shared copy of said second memory block, said step of responding to said second memory access request using said snoop-only approach comprises:

obtaining, using said coherence transformer, a second copy of said second memory block from said computer node via said common bus; and forwarding said second copy of said second memory block from said coherence transformer to said common bus to enable a progenitor of said second memory access request to obtain said second copy of said second memory block.

15. The method of claim 11 wherein said second memory access request is a request for a shared copy and said snoop tag tracking said second memory block indicates that said first copy of said second memory block at said external device is an exclusive copy of said second memory block, said step of responding to said second memory access request using said snoop-only approach comprises:

obtaining, using said coherence transformer, a second copy of said second memory block from said external device;

changing said snoop tag tracking said second memory block to indicate that said first copy of said memory block at said external device is a shared copy of said second memory block; and forwarding said second copy of said second memory block from said coherence transformer to said common bus to enable a progenitor of said second memory access request to obtain said second copy of said second memory block.

16. In a computer system having a computer node which has a common bus, a method for enabling an external device in an external domain that is external to said computer node to share memory blocks having local physical addresses in a memory module at said computer node through a coherence transformer coupled to a common bus of said computer node irrespective whether said external device and said common bus both employ a common protocol and irrespective whether said external device and said common bus both operate at the same speed, each of said memory blocks having an associated Mtag for tracking a global state associated with said each of said memory block, including a global exclusive state for indicating that said each of said memory blocks is exclusive to said computer node, a global shared state for indicating that said each of said memory blocks is shared by said computer node with said external device, and a global invalid state for indicating that said each of said memory blocks is invalid in said computer node, said method comprising:

receiving, at said memory module via said common bus, a first memory access request for a valid copy of a first memory block of said memory blocks from a progenitor of said first memory access request, said progenitor being an entity different from said coherence transformer, said coherence transformer having a snoop tag array having a plurality of snoop tags, each of said plurality of snoop tags being configured to track an external state of a copy of one of said memory blocks if cached by said external device, said external state including one of an external exclusive state for indicating that said copy of one of said memory blocks is exclusive to said external domain, an external shared state for indicating that said copy of one of said memory blocks is shared by said external domain, and an external invalid state for indicating that said copy of one of said memory blocks is invalid in said external domain; and if said first memory block is not tracked in said snoop tag array because said snoop tag array is full, responding to said first memory access request using an Mtag-only approach, including:

sending a first copy of said first memory block, along with a first Mtag corresponding to said first memory block, from said memory module to said progenitor of said first memory block, examining, using said progenitor of said first memory block, said first Mtag state, and if said first Mtag state is invalid, issuing a second memory access request pertaining to said first memory block from said progenitor of said first memory access request to request said coherence transformer to service said second memory access request, thereby enabling said progenitor of said first memory access request to obtain said valid copy of said first memory block.

17. The method of claim 16 further comprising:

if said first memory block is tracked in said snoop tag array, responding to said first memory access request using a snoop-only approach, including:

intervening to respond to said first memory access request, using said coherence transformer, thereby preventing said memory module from responding to said first memory access request.

18. The method of claim 17 wherein said step of responding to s aid first memory access request using said snoop-only approach includes:

obtaining a first copy of said first memory block, using said coherence transformer, from said external domain; and forwarding said first copy of said first memory block from said coherence transformer to said progenitor of said first memory access request.

19. An apparatus for facilitating the sharing of memory blocks between a computer node and an external device, said memory blocks having local physical addresses at said computer node, each of said memory blocks have an associated Mtag for tracking a global state that is associated with said each of said memory blocks including a global exclusive state for indicating that said each of said memory blocks is exclusive to said computer node, a global shared state for indicating that said each of said memory blocks is shared by said computer node with said external device, and a global invalid state for indicating that said each of said memory blocks is invalid in said computer node, said method comprising:

snooping logic that is configured to be coupled with a common bus of said computer node, such that said snooping logic monitors memory access requests on said common bus when coupled to said common bus;

a snoop tag array coupled to said snooping logic, said snoop tag array having a plurality of snoop tags, each of said plurality of snoop tags a configured to track an external state of a copy of one of said memory blocks if cached by said external device, said external state including one of an external exclusive state for indicating that said copy of one of said memory blocks is exclusive to said external domain, an external shared state for indicating that said copy of one of said memory blocks is shared by said external domain, and an external invalid state for indicating that said copy of one of said memory blocks is invalid in said external domain; and logic for ascertaining whether a first memory access request from said external device for a first memory block of said memory blocks should be responded to using a snoop-only approach or an Mtag-only approach when said snoop tag array is full, said snoop-only approach requires a tag in said snoop tag array to track said first memory block for an entire duration that said first memory block is cached by said external device, said Mtag-only approach only temporarily stores said first memory block until a global state associated with said first memory block can be written back into said memory module.

20. The apparatus of claim 19 further comprising logic for ascertaining whether a second memory access for a second memory block on said common bus should be responded to using said snoop-only approach or said Mtag-only approach, said second memory access is responded to by said coherence transformer using said snoop-only approach when said second memory block is tracked by said snoop tag array, said second memory block is responded to by said memory module using said Mtag-only approach when said second memory access is not tracked by said snoop tag array.

* * * * *

UNITED STATES PATENT AND TRADEMARK OFFICE
CERTIFICATE OF CORRECTION

PATENT NO. : 5,829,034
DATED : October 27, 1998
INVENTOR(S) : Hagersten et al.

It is certified that error appears in the above-identified patent and that said Letters Patent is hereby corrected as shown below:

Column 37, line 46, change "s aid" to --said--

Column 38, line 20, change "a" to --is--

Signed and Sealed this

Sixth Day of July, 1999

Attest:

Q. TODD DICKINSON

*Attesting Officer*     *Acting Commissioner of Patents and Trademarks*